US008001171B1

(12) United States Patent  (10) Patent No.: US 8,001,171 B1
Simkins et al.  (45) Date of Patent: Aug. 16, 2011

(54) PIPELINE FFT ARCHITECTURE FOR A PROGRAMMABLE DEVICE

(75) Inventors: James M. Simkins, Park City, UT (US); Vasisht Mantra Vadi, San Jose, CA (US); Helen Hai-Jo Tarn, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1121 days.

(21) Appl. No.: 11/445,066

(22) Filed: May 31, 2006

(51) Int. Cl.
*G06F 15/00* (2006.01)
(52) U.S. Cl. .......................... 708/404; 708/406; 708/409
(58) Field of Classification Search .................. 708/400, 708/403–406, 409
See application file for complete search history.

(56) References Cited

U.S. PATENT DOCUMENTS

| 3,816,734 | A | * | 6/1974 | Brendzel | 708/705 |
| 5,163,017 | A | * | 11/1992 | Wong et al. | 708/406 |
| 5,293,330 | A | * | 3/1994 | Sayegh | 708/406 |
| 6,041,340 | A | * | 3/2000 | Mintzer | 708/403 |
| 6,081,821 | A | * | 6/2000 | Hopkinson et al. | 708/406 |
| 6,917,955 | B1 | * | 7/2005 | Botchev | 708/406 |
| 7,428,564 | B2 | * | 9/2008 | Gibb et al. | 708/409 |
| 2005/0071403 | A1 | * | 3/2005 | Taunton | 708/404 |
| 2005/0102341 | A1 | * | 5/2005 | Taunton | 708/404 |

OTHER PUBLICATIONS

Altera Corporation, "FFT MegaCore Function User Guide," Document Version 2.1.0 rev. 1, Jun. 2004, retrieved from http://web.archive.org/web/20051027194752/www.altera.com/literature/ug/ug_fft.pdf.*
Rabiner and Gold, "Theory and Application of DSP", Prentice Hall, 1975, Chapter 10, Section 10.12.*
Altera Corporation, "FFT/IFFT Block Floating Point Scaling", Document Version 1.0, Oct. 2005.*
U.S. Appl. No. 11/019,518, filed Dec. 21, 2004, Simkins et al.
U.S. Appl. No. 11/019,783, filed Dec. 21, 2004, Simkins et al.
XILINX, Inc., "XTREME DSP for Virtex-4 FPGAs User Guide," UG073, Dec. 19, 2005,(V2.1), pp. 1-130, available on the Internet at http://www.xilinx.com/bvdocs/userguides/ug073.pdf.
Rabiner, Lawrence R. et al., "Theory and Application of Digital Signal Processing", 1975, Ch,. 10, Section 10.12, pp. 604-609, available from Prentice-Hall, Inc., Englewood Cliffs, New Jersey.

* cited by examiner

*Primary Examiner* — Lewis A Bullock, Jr.
*Assistant Examiner* — Matthew Sandifer
(74) *Attorney, Agent, or Firm* — W. Eric Webostad; John J. King

(57) ABSTRACT

A pipeline Fast Fourier Transform ("FFT") architecture for a programmable device is described. A first Radix-2 butterfly stage is coupled to receive a first input, configured to provide a first output responsive thereto, and configured to truncate at least one Least Significant Bit of the first output. A delay and swap stage is coupled to receive the first output and configured to provide a second output. A second Radix-2 butterfly stage is coupled to receive the second output and a second input, configured to provide a third output responsive thereto, and configured to truncate at least one Most Significant Bit of the third output. The first Radix-2 butterfly stage and the second Radix-2 butterfly stage are implemented in digital signal processing slices of a programmable device.

20 Claims, 16 Drawing Sheets

PIPELINE FFT ARCHITECTURE FOR A PROGRAMMABLE DEVICE

FIELD OF THE INVENTION

One or more aspects of the invention relate generally to integrated circuits and, more particularly, to a pipeline Fast Fourier Transform ("FFT") architecture for a programmable logic device.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing ("DSP") tiles, processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. FPGAs may be programmed using configuration memory. Other PLDs may be programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable. For purposes of clarity, FPGAs are described below though other types of PLDs may be used.

Performance of a design instantiated entirely in programmable logic of an FPGA ("FPGA fabric") for a DSP application was less efficient than instantiation at least part of the design using one or more DSP tiles. Moreover, prior to introduction of a significant architectural change in DSP tiles, DSP tiles when cascaded were subject to use of general routing circuitry of FPGA fabric.

However, in Virtex-4™ FPGAs available from Xilinx, Inc. of San Jose, Calif., a new DSP slice is available. This DSP slice, known as a "DSP48" slice, includes an 18-by-18 ("18× 18") bit two's complement multiplier and a 48-bit sign-extended adder/subtractor/accumulator. In a Virtex-4™ FPGA, a DSP tile includes two DSP48 slices. DSP48 slices within a DPS tile, as well as DSP tiles themselves, may be cascaded without having to use general routing circuitry of FPGA fabric. This facilitates higher performance along with lower power consumption for some DSP-dependent functions.

By using one or more DSP48 slices, there may be a corresponding reduction in use of FPGA fabric for DSP-instantiated applications which may lead to more efficient resource utilization of CLBs and other FPGA resources and which, as indicated above, may be lead to lower power consumption and higher performance. A DSP48 slice provides programmable pipelining of input operands and rounding multiplication away from zero. These and other features are described in additional detail in "XTREME DSP for Virtex-4 FPGAs User Guide," UG073 (V2.1), Dec. 19, 2005, available on the Internet at http://www.xilinx.com/bvdocs/userguides/ug073.pdf.

Accordingly, it would be desirable and useful to provide for a Fast Fourier Transform ("FFT") architecture implemented using one or more DSP slices of an FPGA in order to provide for one or more of higher performance, lower power consumption, or enhanced resource utilization for such implementation.

SUMMARY OF THE INVENTION

One or more aspects of the invention generally relate to integrated circuits and, more particularly, to a pipeline Fast Fourier Transform ("FFT") architecture for a programmable logic device.

An aspect of the invention is a pipeline Fast Fourier Transform architecture. A first Radix-2 butterfly stage is coupled to receive a first input. The first Radix-2 butterfly stage is configured to provide a first output responsive to the first input and to truncate at least one Least Significant Bit of the first output for a Fast Fourier Transform. A delay and swap stage is coupled to receive the first output and configured to provide a second output. A second Radix-2 butterfly stage is coupled to receive the second output. The second Radix-2 butterfly stage is configured to provide a third output responsive to the second output and configured to truncate at least one Most Significant Bit of the third output for the Fast Fourier Transform. The first Radix-2 butterfly stage and the second Radix-2 butterfly stage are implemented in digital signal processing slices of a programmable logic device.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
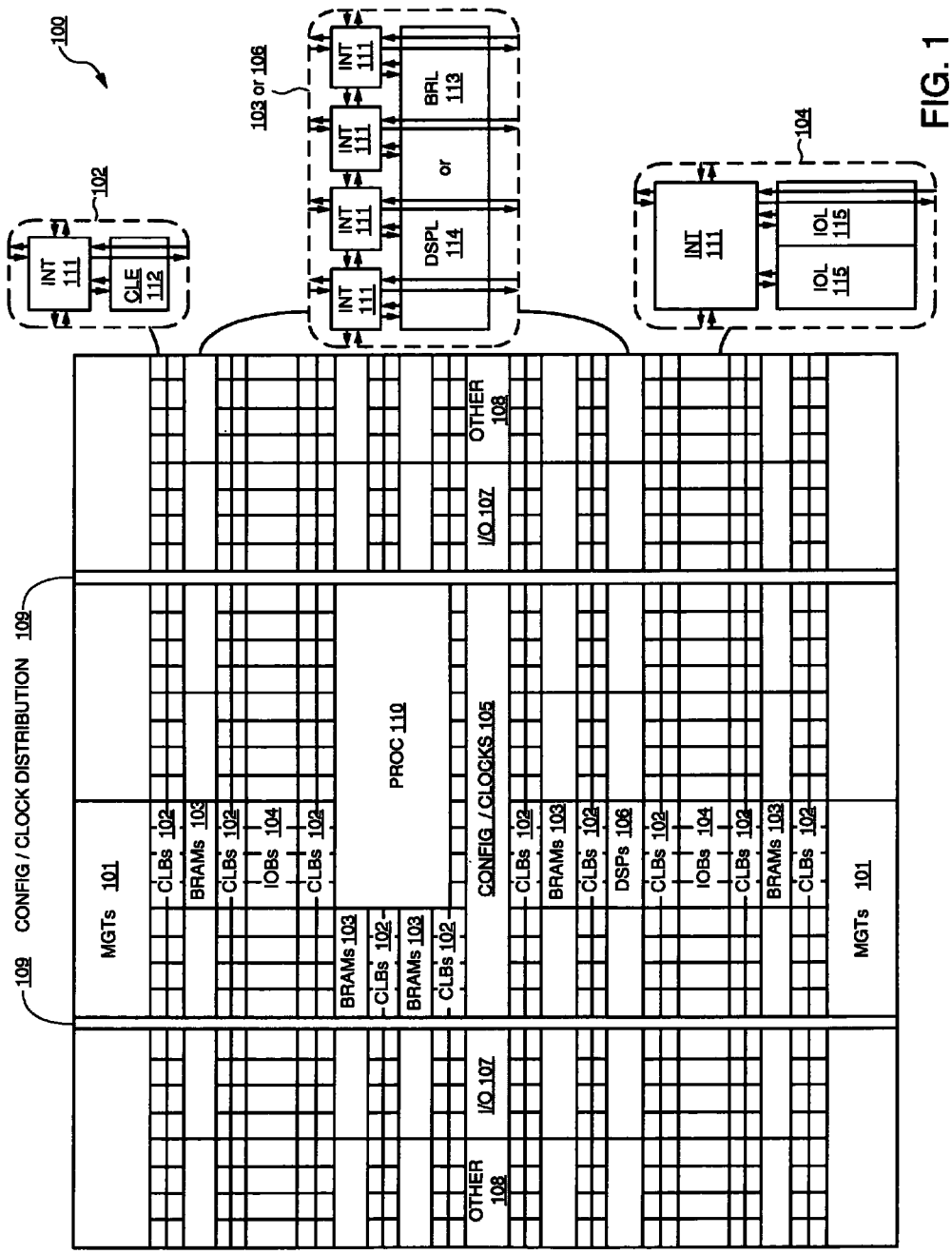
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing ("DSP") tiles 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

Figure 4:
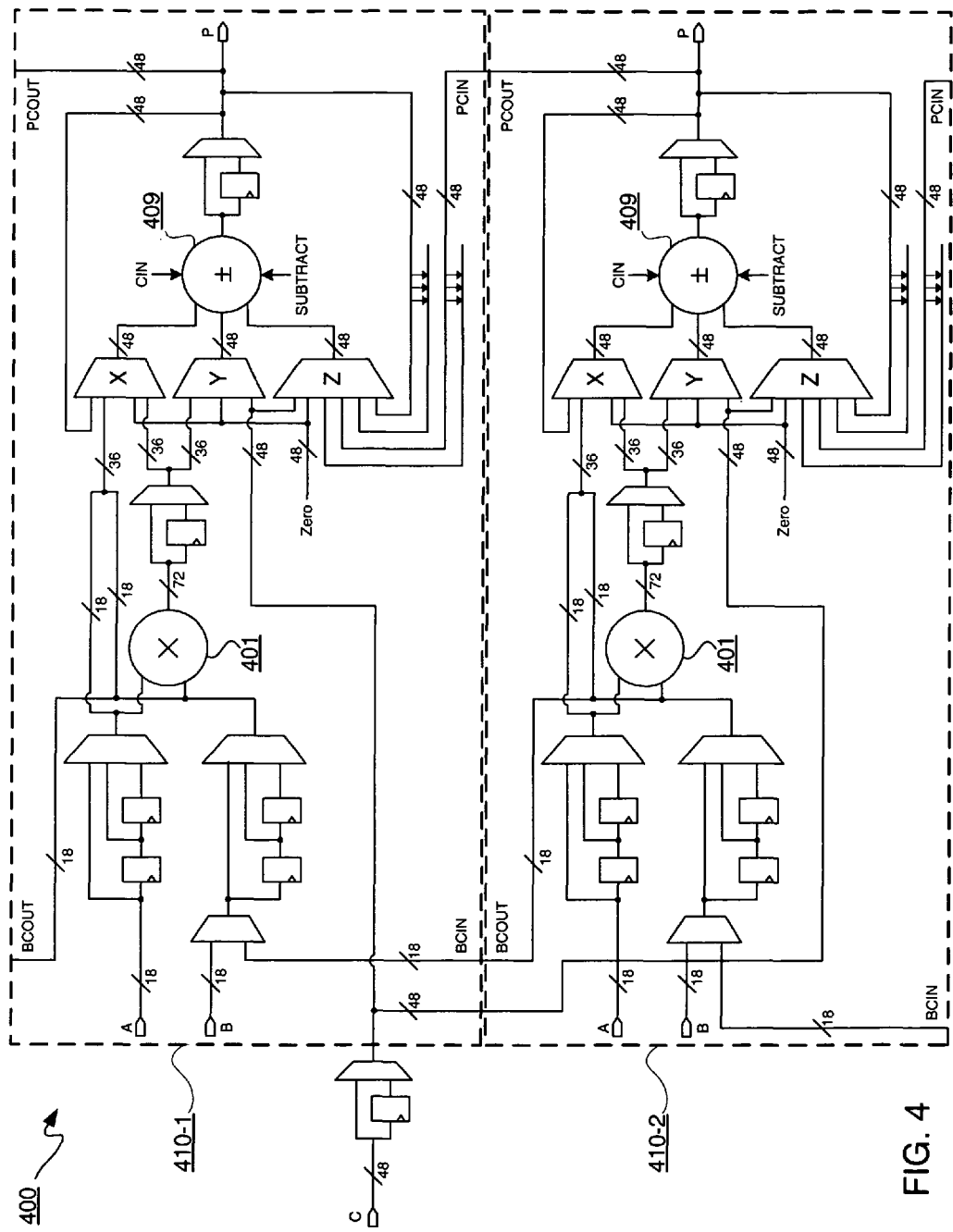
FIG. 4 is a schematic diagram depicting a DSP tile ("DSP48 tile").

The following description is for a pipeline FFT architecture implemented in an FPGA. More particularly, an example implementation using DSP48 slices of a Virtex-4 FPGA is described. Therefore, for purposes of convenient reference, FIG. 4 is included where there is shown a schematic diagram depicting a DSP tile 400 (hereinafter "DSP48 tile"). A DSP48 tile 400 has two DSP48 slices 410-1 and 410-2 (hereinafter collectively "DSP48 slices" 410). Each DSP48 slice 410 has a multiplier 401 (hereinafter "multiplier"), an adder/subtractor 409 (hereinafter "adder"), and X, Y, and Z multiplexers. Notably, DSP48 slices 410-1 and 410-2 have a shared data port. More particularly, for a DSP48 tile 400, each DSP48 slice 410 has two direct 18-bit input data ports, labeled A and B, and DSP48 slices 410 share a direct 48-bit input port labeled C. Additionally, each DSP48 slice 410 has one direct 48-bit output port labeled P, for product, as well as cascaded input and output data paths.

Many other details regarding a DSP48 tile are not included here for purposes of clarity; however, additional information regarding a DSP48 tile may be found in the above-referenced User's Guide, as well as in a co-pending patent application entitled "Programmable Logic Device with Cascading DSP Slices," by James M. Simkins et al., filed Dec. 21, 2004 assigned application Ser. No. 11/019,783, which is herein incorporated by reference. Even though an example implementation using DSP48 slices is provided, it should be appreciated that other types of DSP slices may be used to implement a pipeline FFT architecture 200 of FIG. 2 as described herein.

Figure 2:
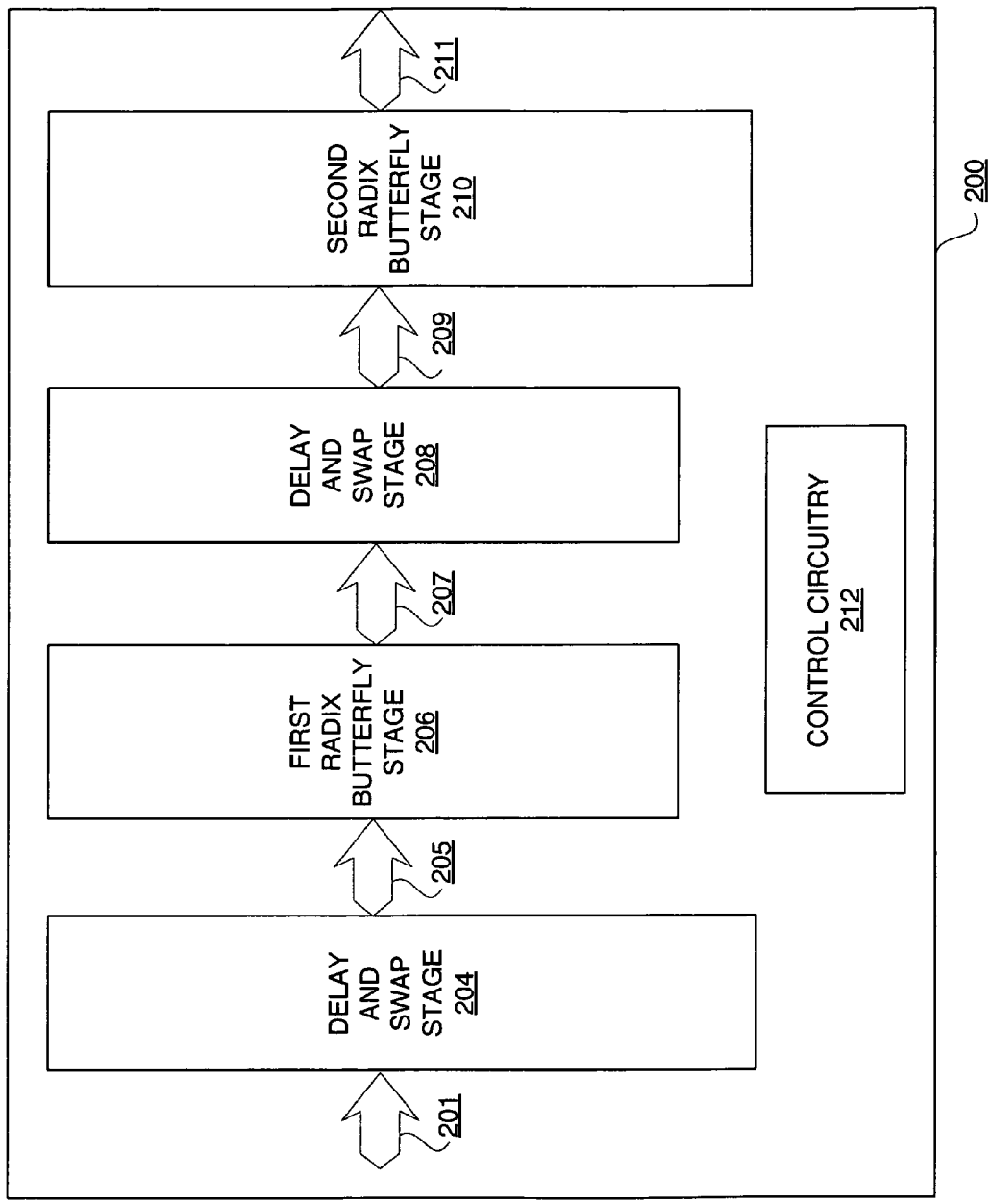
FIG. 2 is a block diagram depicting an exemplary embodiment of a pipeline Fast Fourier Transform ("FFT") architecture.

FIG. 2 is a block diagram depicting an exemplary embodiment of a pipeline FFT architecture 200. Depending on the point size of the FFT and the number of stages implemented, it should be understood that such a pipeline FFT architecture 200 may be implemented in a number of DSP48 tiles, which may vary from application to application.

Input 201 to delay and swap stage 204 may be real and imaginary portions of complex numbers A and B, as well as real and imaginary portions of twiddle factors, namely phase rotators, W. Notably for purposes of clarity, A and B are also used for port designations, as described below in additional detail. Output 205 from delay and swap stage 204 is provided to a first Radix butterfly stage 206. Output 207 from first Radix butterfly stage 206 is provided to a delay and swap stage 208. Output 209 from delay and swap stage 208 is provided as an input to a second Radix butterfly stage 210. Output 211 from second Radix butterfly stage 210 may be provided to an output stage. Control circuitry 212, such as for providing clock-enable signals, clock signals, and reset signals, among other signals, may be part of pipeline FFT architecture 200. Notably, Radix butterflies are described below as Radix-2 butterflies; however, other known Radix butterflies may be used in accordance with the following description.

More particularly, pipeline FFT architecture 200 may include Radix-2 Decimation In Frequency ("DIF") FFT butterflies ("Radix-2 butterflies") implemented in DSP48 slices to provide complex number addition and subtraction, as well as complex number multiplication. In the following example, the implemented complex number equations for providing an FFT are:

$$X = A + B \qquad (1)$$

and $$Y = (A - B)W, \qquad (2)$$

where A, B, X, Y, and W may all be complex numbers. Notably, the designations "X" and "Y" are also used with respect to multiplexers of a DSP48 slice; however, this is not intended to indicate any particular nexus. Radix-2 butterflies may be used for stages 206 and 210, and such butterflies may in part be dual-channel Radix-2 butterflies as described in Rabiner and Gold, "Theory and Application of DSP," Prentice Hall, 1975, Chapter 10, Section 10.12 (hereinafter "Rabiner and Gold"), which is herein incorporated by reference. Notably, a complete version of Radix-2 butterfly, such as a version of complete Radix-2 butterfly as described in Rabiner and Gold, may be implemented. However, a complete version of a Radix-2 butterfly need not be implemented, and thus a subset of the number of delay stages of a complete version of a Radix butterfly may be used. DSP48 slices support input data widths for ports A and B of up to 18 bits for each of the real and imaginary segments of complex numbers A and B; however, for FFT applications, DSP48 slices support input data widths for ports A and B only up to 17 bits, due to intermediate arithmetic operations and associated bit growth for intermediate arithmetic operations, for each of the real and imaginary segments of complex numbers A and B. A Radix-2 butterfly datapath may be implemented using six DSP48 slices, nine flip-flops ("FFs"), and five look-up tables ("LUTs"). However, for purposes of clarity, only two FFT butterfly stages are described, as the implementation of more than two of such stages shall be understood from the description of the implementation of two stages. Moreover, as is known, a delay and swap stage conventionally includes delay and commutation operators as described in Rabiner and Gold, and thus for purposes of clarity only delay and swap stage 208 is described in detail for purposes of signal tracking between butterfly stages.

Again, with continuing reference to FIG. 2 and renewed reference to FIG. 4, each DSP48 slice 410 includes what are referred to as X, Y, and Z multiplexers. Each of the X, Y, and Z multiplexers are 48-bit designs, where selecting any of the 36-bit inputs respectively thereto provides a 48-bit sign-extended output. The multiplier of a DSP48 slice outputs two 36-bit partial products, sign-extended to 48 bits each. Partial products feed the X and Y multiplexers. For an opcode selecting the multiplier of a DSP48 slice, both X and Y multiplexers may be utilized to facilitate the adder/subtractor to combine partial products into a multiplier result.

Accordingly, a data instruction provided via input 201 may be broken up into multiple sets of data for pipelining out of delay and swap stage 204. In the implementation described below in additional detail, the complex addition and subtraction as implemented in butterfly stages are done using a single instruction multiple data ("SIMD") operation. For this example implementation, "0,0" and "1,0" pad bits are used between a lower imaginary segment and an upper real segment to block intra-segment ripple carry. The "0,0" pad bits are insert between the real and imaginary segments of the "A:B concatenated port" input into the X multiplexer, namely a 36-bit input port to an X multiplier in FIG. 4 for example, and the "1,0" pad bits are inserted between the real and imaginary segments of the C port input, namely a 48-bit port input in FIG. 4 for example. The multiplier is bypassed for addition and subtraction, and thus the A and B ports may be concatenated to create a 36-bit wide "A:B concatenated port" for an adder/subtractor. Notably, if imaginary segment operands are different signs, a Most Significant Bit ("MSB") correction may be used for each imaginary segment. Subtraction in a DSP48 slice 410 may be implemented by inverting the output of the Z multiplexer and then performing an add by the adder 409 of the DSP48 slice 410. The output of adder 409 may be inverted. This inversion of the output of adder 409 effectively provides a double inversion and obviates having a carry input under a conventional two's complement subtraction method, namely invert and add a carry input (e.g., ~(~Z+X)=(Z+~X+1)). Thus, a DSP48 is effectively run in a SIMD mode. SIMD operations that were not possible with the conventional subtraction approach having only one carry input may now be implemented using a DSP48 slice as described above having double inversion and appropriate input pad bits between SIMD input segments.

Using SIMD, complex addition and subtraction may be implemented in a same slice by blocking internal carry propagation by using appropriate input pad bits between SIMD input segments. Thus, two slices, or one DSP48 tile 400 for example, may be used to provide complex addition and subtraction. A complex multiply, for example for Equation (2), may for example be implemented in two DSP48 tiles 400, namely four DSP48 slices 410. The complex multiply may include symmetric rounding of a result, and thus all four multipliers 401 and all four adders 409 may be used in the four DSP48 slices 410. However, again, a single DSP48 tile 400 implementation is described herein for purposes of clarity. Alternatively, rather than symmetric rounding, random or pseudo-random rounding may be used. By random rounding, it is meant the carry input bit is selected randomly or pseudo-randomly.

In the implementation described below in additional detail, first Radix butterfly stage 206 may allow a data path to grow in bit width and then scale back the bit width of such data path. Thus, the rounding used in first Radix butterfly stage 206 truncates one or more Least Significant Bits ("LSBs"). For example, the LSB may be truncated in first Radix butterfly stage 206. However, second Radix butterfly stage 210 may be used to carry precision, namely to carry the Least Significant Bits ("LSBs"), where one or more MSBs may be scaled. In other words, scaling of MSBs, which only affect the sign of the bits in second Radix butterfly stage 210, may be implemented. For example, the MSB may be truncated in the second Radix butterfly stage 210. The differences between first and second Radix butterfly stages 206 and 210 are described below in additional detail. Alternatively, different combinations of non-scaling and scaling Radix butterflies, and more particularly Radix-2 butterflies, other than those specifically described herein may be used. Notably, with reference to Radix butterfly stages 206 and 210, six DSP48 slices are used for each. Each of Radix butterfly stages 206 and 210 uses two of such six DSP slices for complex addition and subtraction, and each of Radix butterfly stages 206 and 210 uses the remaining four of such six DSP slices for complex multiplication. However, the four DSP slices in each of Radix butterfly stages 206 and 210 used for complex multiplication may have a similar implementation. This is because in both Radix butterfly stages 206 and 210, symmetric rounding may be part of a complex multiply, but the rounding point may be different in the Radix butterfly stages 206 and 210 to allow LSB truncation in Radix butterfly stage 206, and MSB truncation in Radix butterfly stage 210. Moreover, rather than symmetric rounding, random or pseudo-random rounding may be used.

Because only two Radix-2 butterfly delay stages are described, relatively small delay lines may be used. These relatively small delay lines may be implemented using shift register LUTs ("SRLs") for delay lines. For larger delay lines than those described herein, or in place of the SRLs described herein, memory, such as BRAM, may be used to provide delay lines. Such memory may be configured for a read-first mode, where four memory operations are performed for each memory clock cycle, with a read/write operation for each BRAM port. Basically, a read-first mode is where data is read out from an address before data is written to that address in the BRAM within the same cycle. It should be appreciated that BRAM is dual-ported memory.

Notably, pipeline FFT architecture 200 may be used for low power applications, where power consumption is reduced in comparison to conventional FFT architectures by as using low-power BRAM or SRLs for inter-stage delay lines. Furthermore, pipeline FFT architecture 200 may be used for applications with a relatively low latency, such as for example applications involving voice or moving images or a combination thereof such as in multimedia applications. Accordingly, raw data provided via input 201 may for example be limited to 14 bits instead of 17 bits, depending on signal-to-noise ratio targets. However, for purposes of clarity by way of example and not limitation, it shall be assumed that a 17-bit input is used, as described below in additional detail.

More particularly, an instruction provided as input 201 may include real and imaginary portions of a first twiddle factor, W, for first butterfly stage 206. Input 201 may further include real and imaginary portions of a second twiddle factor, W2, for second butterfly stage 210. Notably, different twiddle factors are used for first and second butterfly stages 206 and 210 to allow for different or same twiddle factors to be used.

Additionally, input 201 includes real and imaginary portions of complex numbers A and B.

Stages of pipeline FFT architecture 200 may be clocked responsive to a common clock-enable signal, which may be a global clock-enable signal or a pipelined clock-enable signal. Furthermore, reset signaling may be done responsive to a global reset signal or a pipelined reset signal. For purposes of clarity and not limitation, pipelined clock-enable and reset signaling is used where a "Q" designation in the signal name indicates a pipeline output stage. For example, a second stage pipeline output of a reset signal is indicated by the "QQ" in the signal nomenclature "RSTQQ."

Radix butterfly stage 206 input 205 and second Radix butterfly stage 210 input 209 may be clocked out of delay and swap stages 204 and 208, respectively, and thus each of the signals associated with inputs 205 and 209 may be designated with a "Q" to indicate that they are outputs. Accordingly, in FIG. 3A, signals 285 through 288 may be synchronously provided from delay and swap stage 204, and in FIGS. 3A and 3B, signals 321 through 324 may be synchronously provided from delay and swap stage 208. Notably, for purposes of clarity by way of example and not limitation, signals 281 through 288 are each 18-bit wide signals. It should be appreciated that for purposes of clarity, single instances of circuits are shown throughout this description, rather than showing the multiples of circuits, such as for example to support 18-bit wide input for each of the above-mentioned signals.

Figure 3A:
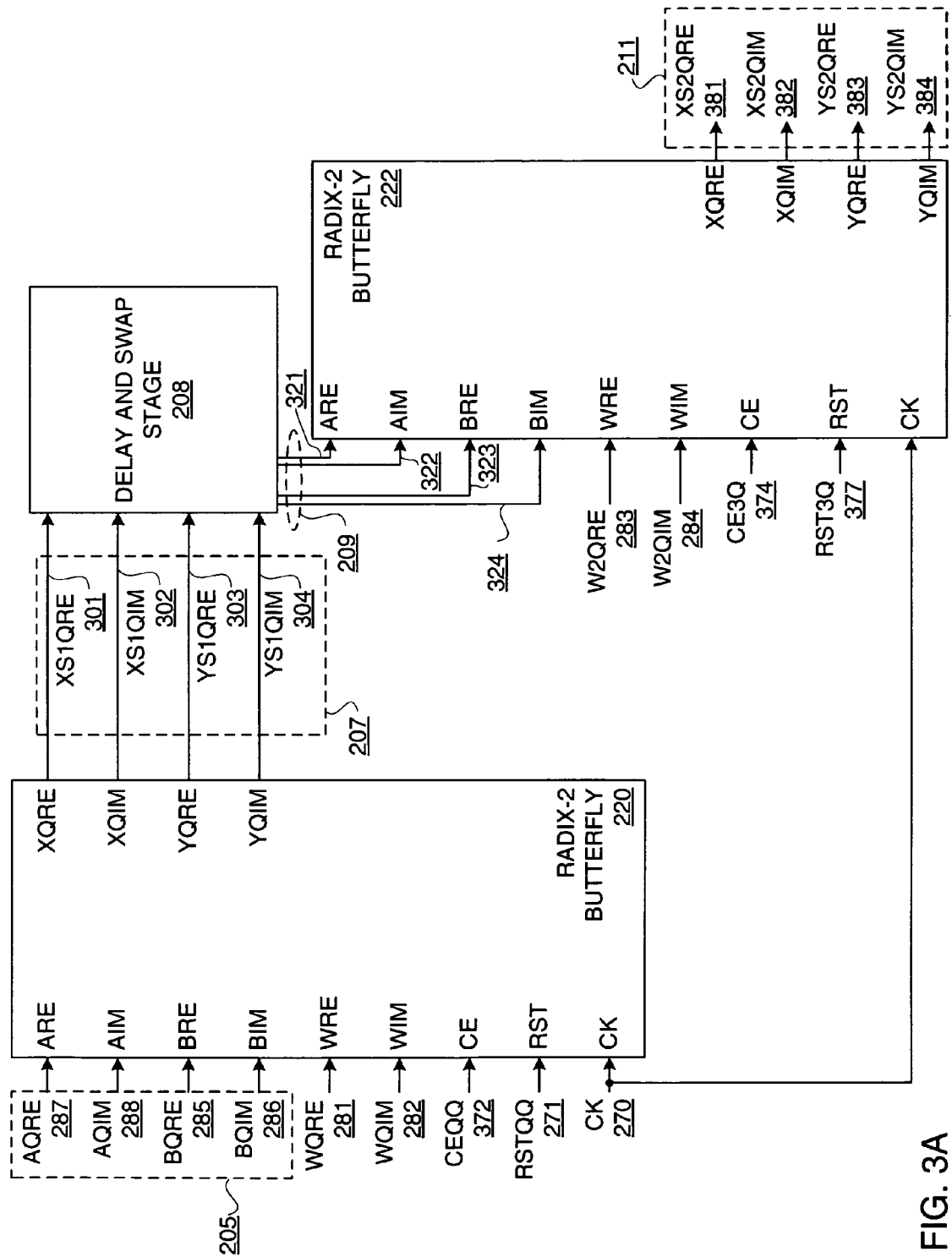
FIG. 3A is a signal flow/block diagram depicting an exemplary embodiment of another portion of the pipeline FFT architecture of FIG. 2.

FIG. 3A is a signal flow/block diagram depicting an exemplary embodiment of another portion of pipeline FFT architecture 200 of FIG. 2. More particularly, FIG. 3A includes Radix butterfly stages 206 and 210 of FIG. 2, as well as delay and swap stage 208. First Radix butterfly stage 206 of FIG. 2 may be implemented with Radix-2 butterfly 220 and second Radix butterfly stage 210 of FIG. 2 may be implemented with Radix-2 butterfly 222. These butterflies may be premised on butterflies described in Rabiner and Gold, as indicated above; however, such Radix-2 butterflies 220 and 222 are modified which is not shown or described in Rabiner and Gold, but is described below in additional detail.

Output 205 is provided to Radix-2 butterfly 220. More particularly, first stage real and imaginary portions of a twiddle factor, W, namely respective signals 281 and 282, are provided to real and imaginary twiddle factor ports of Radix-2 butterfly 220. Signals 281 and 282 may each be 18-bit signals, namely (17:0). Real and imaginary portions of a first stage output of a complex number A, namely respective signals 287 and 288, may be respectively provided to real and imaginary ports for a first complex number A of Radix-2 butterfly 220. The term "imaginary" as used herein is to indicate a portion of a complex number, and thus the term "imaginary" used as an adjective to modify port in this example is to indicate that an actual port is used for an imaginary portion of a complex number. Notably, Radix butterflies stages 206 and 210 of FIG. 2 may have respectively associated therewith storage, such as BRAM for example, for storing twiddle factors for used with Radix butterflies associated with such stages. Accordingly, signals 281 through 284 may come from such twiddle factor storage.

Real and imaginary portions of a first stage output of a complex number B, namely respective signals 285 and 286, may be respectively provided to real and imaginary ports for a second complex number B of Radix-2 butterfly 220. Signals 285 through 287 may be respective 17-bit (16:0) input signals.

A clock-enable signal 372, as described below in additional detail, may be provided to a clock-enable port of Radix-2 butterfly 220. Additionally, Radix-2 butterfly 220 may be reset responsive to reset signal 271 and clocked responsive to clock signal 270.

Output 207 from Radix-2 butterfly 220 may include real and imaginary portions of a complex number X as a output, namely respective signals 301 and 302. Notably, an "S1" notation is used to indicate that these values may be output from as FFT results from a first butterfly stage of an FFT architecture 200 of FIG. 2. Notably, a first butterfly stage of an FFT architecture is not to be confused with a first stage of pipeline as used herein. Notably, as indicated in Equation (1) above, X is for the complex addition of (A+B). Thus, signal 301 is the real portion obtained from the addition of complex numbers A and B, and signal 302 is the imaginary portion obtained from the addition of complex numbers A and B. Furthermore, it should be noted that signals 301 and 302, as well as signals 303 and 304, are each 17-bit wide signals, due to LSB truncation as indicated above.

Additionally, output 207 from Radix-2 butterfly 220 may include real and imaginary portions of a complex number Y as a first stage output, namely respective signals 303 and 304. These are first stage outputs for a real portion of Y and an imaginary portion of Y, namely respectively signals 303 and 304, as indicated in Equation (2) above, where Y is given by the subtraction of complex number B from A with the result multiplied by twiddle factor W. It should be appreciated that the real and imaginary portions of the twiddle factor W are obtained from signals 281 and 282, respectively, for multiplication with the result of (A−B). Notably, bit (17), namely the 18th bit of each of signals 281 and 282 is used for the multiplication, as described below in additional detail.

It should be appreciated that multiplier 401 in a DSP48 slice 410 is used to provide the multiplication, and an adder 409 of a DSP48 slice 410 is used to provide the addition and subtraction of complex numbers. The output of Radix-2 butterfly 220 may be cascaded for input to Radix-2 butterfly 222, after passing through delay and swap stage 208. Again, Radix-2 butterfly 220 truncates one or more LSBs, whereas Radix-2 butterfly 222 truncates one or more MSBs.

Accordingly, inputs 205 to Radix-2 butterfly 220 may be summarized as follows:

$$A = AQRE(16:0) + jAQIM(16:0), \tag{3a}$$

$$B = BQRE(16:0) + jBQIM(16:0), \text{ and} \tag{3b}$$

$$W = WQRE(17:0) + jWQIM(17:0). \tag{3c}$$

The W twiddle factor is balanced, and thus does not use the most negative number in the sine/cosine functions. The result of (A−B) may grow from 17 bits to 18 bits, given that W does not use the most negative number, and the 18×18 multiply may thus create a 35-bit result. Adding two of these results in a complex multiply may grow the final real and imaginary bit width to 36 bits. These 36 bits may be symmetrically rounded and truncated back to two separate 17-bit values. A complex add of (A+B) with simple rounding uses "1,0" pad bits between real and imaginary segments of both an "A:B port" of a DSP48 slice 410 and shared C port with another DSP48 slice. The "A:B port" reference of a DSP48 slice 410 is to indicate that multiplier 401 is bypassed, and inputs to ports A and B may be provided to multiplexer X for addition or subtraction by adder 409. The real and imaginary portions of the complex number X may be output on port P of this DSP48 slice 410, as described below in additional detail for output of a complex number Y.

The other DSP48 slice of a DSP48 tile in which Radix-2 butterfly 220 may be implemented computes in part (A−B), and uses "0,0" as SIMD pad bits. Accordingly, C port input and A:B port addition and subtraction may be respectively expressed as indicated below as inputs (4a) through (4c):

$$Cport=0,0,\ldots 0, AQRE(16), AQRE(16:0), 1, 0, AQIM(16:0), \tag{4a}$$

$$A{:}Bport(A+B) = BQRE(16:0), 1, 0, BQIM(16:0), \text{ and} \tag{4b}$$

$$A{:}Bport(A-B) = BQRE(16:0), 0, 0, BQIM(16:0). \tag{4c}$$

Notably, the upper real segment, which is sign-extended, does not need any MSB correction output logic, and BQRE(16) may be automatically sign-extended when A:B goes from a 36-bit number to a 48-bit number at the output of the X multiplexer of a DSP48 slice. Additionally, the Cport input is used in this configuration to provide real and imaginary data for the complex number A. Moreover, the A and B ports are used to provide real and imaginary data for the complex number B.

A carry input may be asserted for a round of a lower segment associated with an addition of an imaginary component, while "1,0" pad bits may provide a carry input for an upper segment associated with addition of a real component. The "0,0" and "1,0" SIMD pad bits facilitate packing of real and imaginary segments. However, if the imaginary segment input operands have opposite sign bits, then one or more MSBs of imaginary add/subtract results may be corrected by inverting the MSBs of the add/subtract results. The (A+B) complex number addition segments may be truncated back to 17 bits and output on real and imaginary exports of Radix-2 butterfly 220. In this instance, the (A−B) complex subtraction result is not rounded and grows to 18 bits, namely the inclusion of the LSB, which result of such complex subtraction is input to multipliers of DSP48 slices for multiplication by twiddle factor W.

A complex multiplication of real and imaginary components of the result of (A−B) multiplied by twiddle factor W, or "(A−B)W," results in a 48-bit output. Of the 48-bit output, the lower 19 bits are rounded and truncated, the next 17 bits are valid data, and the upper 12 bits indicate the sign extension. The symmetric round carry input for real and imaginary correction is listed in Equations (5a) and (5b) respectively:

$$\text{Carry\_In\_Real} = (AMBQIM(17) \text{ XOR } WQIM(17)) \\ \text{AND } (AMBQRE(17) \text{ XNOR } WQRE(17)), \text{ and} \tag{5a}$$

$$\text{Carry\_In\_Imag} = (AMBQRE(17) \text{ XNOR } WQIM(17)) \\ \text{AND } (AMBQIM(17) \text{ XNOR } WQRE(17)). \tag{5b}$$

Notably, in Equations (5a) and (5b), the 18th bit is indicated as being used, and is described in additional detail below with respect to logic configuration for Radix-2 butterfly 220. The symmetric rounding constant for the complex multiply for this example implementation is indicated below in Equation 5(c):

$$Cport(RND\_Constant) = 0x00000003FFFF. \tag{5c}$$

The real and imaginary outputs from Radix-2 butterfly 220 for the complex result Y are respectively provided via output port P of a DSP48 slice 410 used to implement Radix-2 butterfly 220. The product output port P of a DSP48 slice 410 may be used to provide either a real or imaginary output, as indicated in the following equations:

$$YQRE(16:0) = PRE(35:19), \text{ and} \tag{5d}$$

$$YQIM(16:0) = PIM(35:19). \tag{5e}$$

Thus, for example, as indicated in Equations 5(d) and 5(e), the real portion of complex number result Y, namely signal 303, may be output from product port P of a DSP48 slice by effectively associating the 17-bit output to the valid data bits, namely bits (35:19) in this example. Moreover, the imaginary portion of the complex result Y may be provided from product port P of another DSP48 slice 410 at the same bit locations as used for the real portion, by using bits (35:19).

Outputs 207 from Radix-2 butterfly 220 are provided as inputs to delay and swap stage 208. Delay and swap stage 208 provides output 209 to Radix-2 butterfly 222. Delay and swap stage 208 is described in additional detail with reference to FIG. 3B.

Figure 3B:
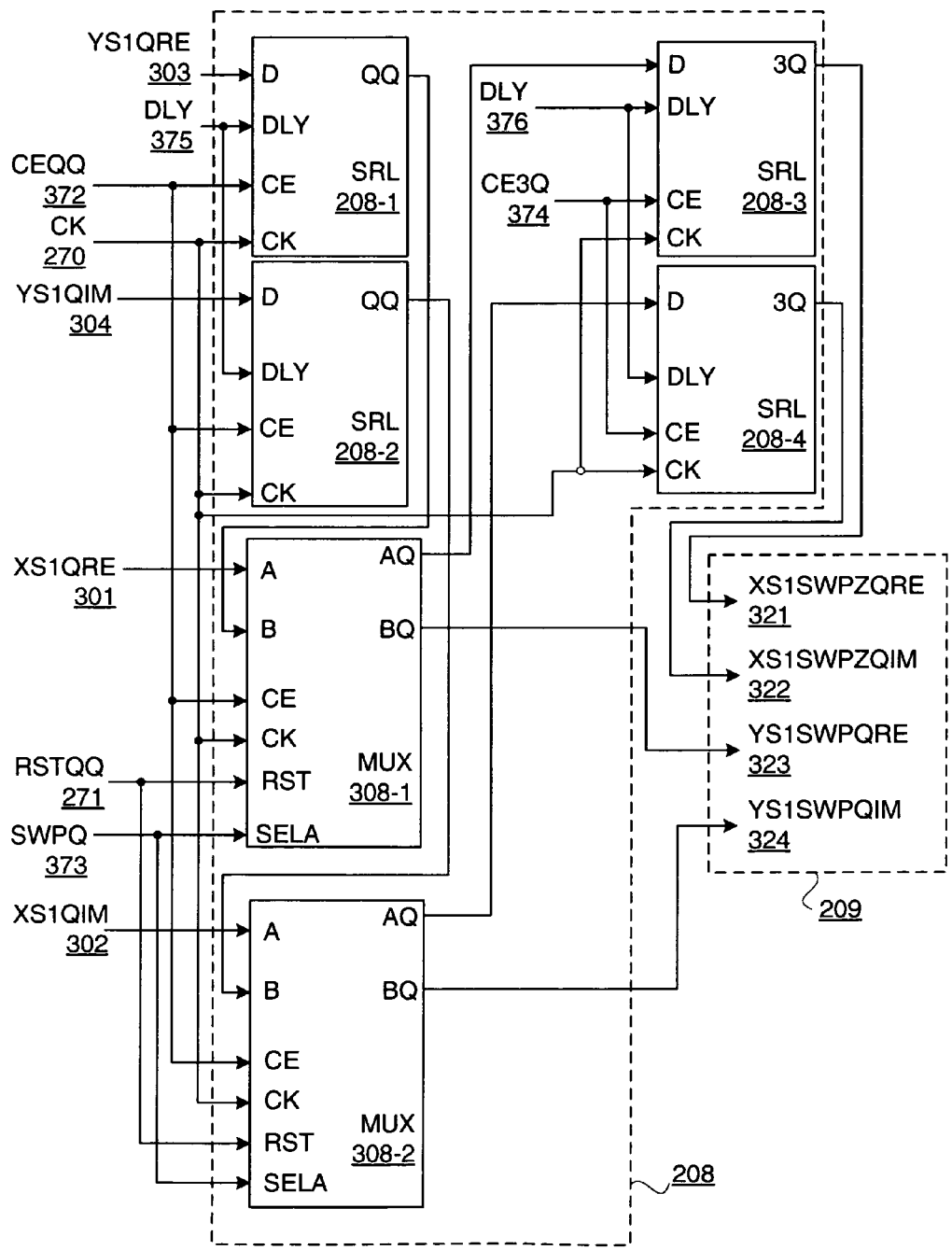
FIG. 3B is a block diagram depicting an exemplary embodiment of a delay and swap stage of the pipeline FFT architecture of FIG. 2.

FIG. 3B is a block diagram depicting an exemplary embodiment of a delay and swap stage 208. In this exemplary embodiment, delay and swap stage 208 is implemented with four 17 by 17 ("17×17") SRLs, namely SRLs 208-1 through 280-4, and two 17×17 multiplexers, namely "swap" multiplexers 308-1 and 308-2. Again, because only two stages are illustratively shown, SRLs may be used for the 17-point input. However, BRAM may be used to provide the delay line length.

In FIG. 3B, SRLs and multiplexers are clocked responsive to a same clock signal 270. Additionally, multiplexers are reset responsive to reset signal 271, and clock enable signal 372 is used to activate second pipeline stage SRLs and clock enable signal 374 is used to activate third pipeline stage SRLs.

It should be appreciated that SRLs are used in this example implementation to provide delay lines, where delay line depth, namely the amount of delay provided, is set responsive to a delay control setting. However, fixed length delay lines may alternatively be used. As will become more apparent from the following description, the multiplexers used in this example implementation are commutators that do one of two things. The commutators may in some instances allow two input buses, which in this example are 17-bit input buses, to pass through to output registers as is. In other instances, the commutators may swap the two input buses on the output registers.

A real portion of complex number Y, namely signal 303, is provided to a data input port of SRL 208-1. SRL 208-1 has an initial attribute depth setting responsive to delay signal 375 to adjust the delay of the delay line which it represents. In this particular example, where "L" is for a low level and "H" is for a high level, the initial attribute setting is L,L,H,H ("0,0,1, 1."), which in total is a delay of 4, namely a delay of 3 for the SRL plus a delay of one for the output pipeline flip-flop. SRL 208-2 receives signal 304 to obtain the imaginary portion of complex number Y to a data input port thereof. Again, delay signal 375 is used to set the delay value of SRL 208-2. SRLs 208-1 and 208-2 are clock activated responsive to clock enable signal 372, namely signal CEQQ, and are clocked responsive to clock signal 270. Notably, these signals 372 and 270 are not shown going to delay and swap stage 208 of FIG. 3B for purposes of clarity.

Outputs of SRLs 208-1 through 208-4 (collectively, "SRLs 208") are indicated as QQ outputs to indicate that they are for a second pipelining stage. Notably, control signals, as described below in additional detail, may employ separate pipelines to track with SRLs for example. More particularly, output of SRL 208-1 is provided to a B input port of multiplexer 308-1, and output of SRL 208-2 is provided to a B input port of multiplexer 308-2. Notably, inputs to B ports of multiplexers 308-1 and 308-2 respectively from SRLs 208-1 and 208-2 will have added delay owing to passing through the respective delay lines provide in this example with SRLs. The delays associated with the respective inputs, however, should be at least approximately equivalent to one another as delay lines provided to SRLs 208-1 and 208-2 are set to the same initial attribute.

Input to A ports of multiplexers 308-1 and 308-2 are the real and imaginary portions, respectively, of complex result X output from first Radix butterfly stage 206 of FIG. 2, namely signal 301 as provided to input port A of multiplexer 308-1 and signal 302 as provided to input port A of multiplexer 308-2. Thus, it should be appreciated that multiplexer 308-1 is used to commutate real portions of complex results X and Y for output, where output of input to port A of multiplexer 308-1 is provided on output port AQ of that multiplexer, and where output of input to port B of multiplexer 308-1 is provided on output port BQ of that multiplexer. A swap ("SWP") signal 373 may be provided to multiplexers 308-1 and 308-2 for selecting AQ and BQ outputs. Notably, this swap control signaling may be provided in accordance with Rabiner and Gold.

Correspondingly, multiplexer 308-2 is used to commutate imaginary portions of complex results X and Y for output. The imaginary portion of complex result X output from first Radix butterfly stage 206 of FIG. 2 is provided to an A port of multiplexer 308-2. The imaginary portion of complex result X may be output on the AQ port of multiplexer 308-2, and the imaginary portion of complex result Y, after being delayed as described above by SRL 208-2, may be output on the BQ port of multiplexer 308-2. The output from the AQ ports of multiplexers 308-1 and 308-2 are therefore respectively the first stage swapped real and imaginary portions of the complex result X. And, the output from the BQ ports of multiplexers 308-1 and 308-2 are therefore respectively the first stage swapped real and imaginary portions of the complex result Y. Notably, multiplexers 308-1 and 308-2 may be thought of as providing a partial butterfly pattern or pre-butterfly pattern for passing data straight through or cross-coupled passage of data.

Notably, the output from the BQ port of multiplexer 308-1 is an S1 SWP signal 323 for a real portion of a complex number Y. The output from the BQ port of multiplexer 308-2 is an S1 SWP signal 324 for an imaginary portion of the complex number Y. Outputs from the AQ ports of multiplexers 308-1 and 308-2 are respectively provided to SRLs 208-3 and 208-4 for further delay.

Output from the AQ port of multiplexer 308-1 is provided to a data input port of SRL 208-3, and output from the AQ port of multiplexer 308-2 is provided to a data input port of SRL 208-4. SRLs 208-3 and 208-4 are set to an initial attribute setting responsive to delay signal 376. In this particular example, delay signal 376 is L,H,H,H ("0,1,1,1"), which in total is a delay of 8, namely a delay of 7 for the SRL plus a delay of one for the output pipeline flip-flop. Thus, it should be appreciated that SRLs 208-1 and 208-2 are set to a first delay, and SRLs 208-3 and 208-4 are set to a second delay different from the first delay. Delay provided by SRLs 208-1 and 208-2 corresponds to a delay of 4, and delay provided by SRLs 208-3 and 208-4 corresponds to a delay of 8.

SRLs 208-3 and 208-4 are clocked responsive to clock signal 270, and are clock enabled responsive to clock enable signal 374, namely CE3Q or CEQQQ. Clock enable signal 374 is from a third stage output of a clock enable pipeline. Output signal 321 from SRL 208-3 is the real portion of complex result X from a first stage after swapping, and with a different delay, namely 8 units of delay added in part by SRL 208-3, than the outputs obtained from BQ ports of multiplexers 308-1 and 308-2. Notably, the designation "Z" for delay and a multiplexer Z of a DSP48 slice is not intended to indicate any particular nexus. Output signal 321 is an S1 SWP signal 321 with a delay Z, which in this example is for 8 units of delay, for a real portion of a complex number X. The output of SRL 208-4 is the imaginary portion of complex result X for first stage after swapping and with the added delay Z, namely signal 322 which is delay by 8 units of delay. Output signal 322 is an S1 SWP signal 322 with a delay Z, which in this example is for 8 units of delay, for an imaginary portion of a complex number X. Thus, real and imaginary portions for X and Y are provided as output 209, namely provided as signals 321 through 324.

Referring again to FIG. 3A, output 209 is provided to Radix-2 butterfly 222. Again, Radix-2 butterfly 222 may be used for implementing second Radix butterfly stage 210 of FIG. 2.

S1 SWP signal 321 is provided to a real port A for a complex number A of Radix-2 butterfly 222. Thus, the real portion of complex result X of stage 1 is associated with the real portion of a complex number A in the second stage. S1 SWP signal 322 is provided to an imaginary port A of for the complex number A Radix-2 butterfly 222. Thus, the imaginary portion of complex result X of stage 1 is associated with the imaginary portion of a complex number A in the second stage. In short, X from stage 1 is A in stage 2.

Likewise, a real portion of complex result Y after a first stage and after swapping is provided via signal 323 to a B port of Radix-2 butterfly 222 for a real portion, and the corresponding imaginary portion of the complex result Y after a first stage and after swapping is provided as signal 324 to a B port of Radix-2 butterfly 222 for an imaginary portion. In short, Y from stage 1 is B in stage 2.

Additionally, twiddle factors are provided to respective twiddle factor ports of Radix-2 butterfly 222. More particularly, a real portion of twiddle factors, namely signal 283 is provided to a W port of Radix-2 butterfly 222 for a real portion, and an imaginary portion of twiddle factors, namely signal 284, is provided to a W port of Radix-2 butterfly 222 for an imaginary portion.

Radix-2 butterfly 222 may be clocked responsive to clock signal 270. Furthermore, Radix-2 butterfly 222 may be clock enabled responsive to clock-enable signal 374 and reset responsive to reset signal 377, where clock-enable signal 374 and reset signal 377 are each from a third stage of respective pipelines of control circuitry, as described below in additional detail.

Output 211 of Radix-2 butterfly 222 is real and imaginary portions of a complex X result and real and imaginary portions of a complex Y result for a second stage. More particularly, a real portion of a complex result X for a second stage output is signal 381, and an imaginary portion of a complex result X for a second stage output is signal 382. Furthermore, a real portion of a complex result Y for a second stage output is provided via signal 383, and an imaginary portion of a complex result Y for a second stage output is provided via signal 384.

It should be appreciated that a complex multiply may employ more pipeline stages than a complex addition of A and B. Accordingly, delay lines, such as may be implemented via SRLs as described above, in the pipeline FFT architecture, such as pipeline FFT architecture 200 of FIG. 2, may be adjusted to nullify this difference in delay. In this particular example, there are six DSP48 slices for each butterfly, where two of these slices are for complex addition and subtraction and the remaining four slices are for complex multiplication. Thus, in this example, delay lines may have to be implemented to nullify the difference in delay associated with the four more pipeline stages of the slices used for complex multiplication.

In the example implementation, SRLs, including a pipeline output flip-flop, may have a depth of eight clock cycles if the Radix-2 butterfly 222 had the same delay for X and Y data paths. However, because the Y data path is four pipeline stages longer than the X data path, the delay, such as provided via SRLs, is reduced from eight to four with respect to the Y output data path. Notably, SRLs may be coupled externally to a DSP48 slice, such as via CLBs of an FPGA. Alternatively, BRAM, which may be considered part of or separate from a DSP48 tile, may be used instead of SRLs.

With reference to Radix-2 butterfly 222, input operands are not full scale, and thus bit width may be allowed to grow without causing an overflow condition. Allowing bit width growth for one or two initial stages in pipeline FFT architecture 200 of FIG. 2 as described in this example implementation may reduce signal-to-noise ratio ("SNR") loss due to rounding by limiting raw data FFT input, for example to less than 17 bits. Thus, differences in symmetric rounding points for Radix-2 butterfly 222 in contrast to Radix-2 butterfly 220 may be expressed as indicated in Equation (6a) with a different rounding constant as expressed in Equation (6b) as follows:

$$A{:}Bport(a+b)=BQRE(16{:}0),0.0,BQIM(16{:}0) \text{ and no carry input, and} \quad (6a)$$

$$Cport(RND\_Constant)=0x00000001FFFF. \quad (6b)$$

Furthermore, as indicated above, in order to obtain valid data, output bits may be shifted to where valid data is provided on a product output port B of a DSP48 slice 410. In this particular example, output signals for the real and imaginary parts of complex result Y are provided at bit locations 18 through 34 on port P of a DSP48 slice 410, as indicated in Equations (6c) and (6d):

$$YQRE(16{:}0)=PRE(34{:}18); \text{ and} \quad (6c)$$

$$YQIM(16{:}0)=PIM(34{:}18). \quad (6c)$$

Notably, it should be appreciated that pipeline FFT architecture 200, as described herein, is suitable for dual-channel operation. Although a 16-point FFT has been described, other point values for an FFT may be used. For example, for a dual-channel 1024-point FFT as described herein, 48 DSP48 slices (e.g., 8 full butterfly stages times six DSP48 slices per butterfly; the last two stages do not have to have a complex multiply and thus the last two stages may omit DSP48 slices) may be used along with 8 BRAMs. An additional 672 CLB slices, for a Virtex-4 FPGA from Xilinx, may be used, where the last two stages of such an FFT may be implemented with CLBs configured to provide addition and subtraction, as such last two stages do not involve complex multiplication. Notably, for dual-channel or single-channel operation to about approximately 500 megahertz, such an FFT architecture as described herein may have a power consumption that is approximately one-half to one-third of that for an FFT using Radix-4 butterflies implemented with three multipliers and five adders for each complex multiply.

Figure 3C:
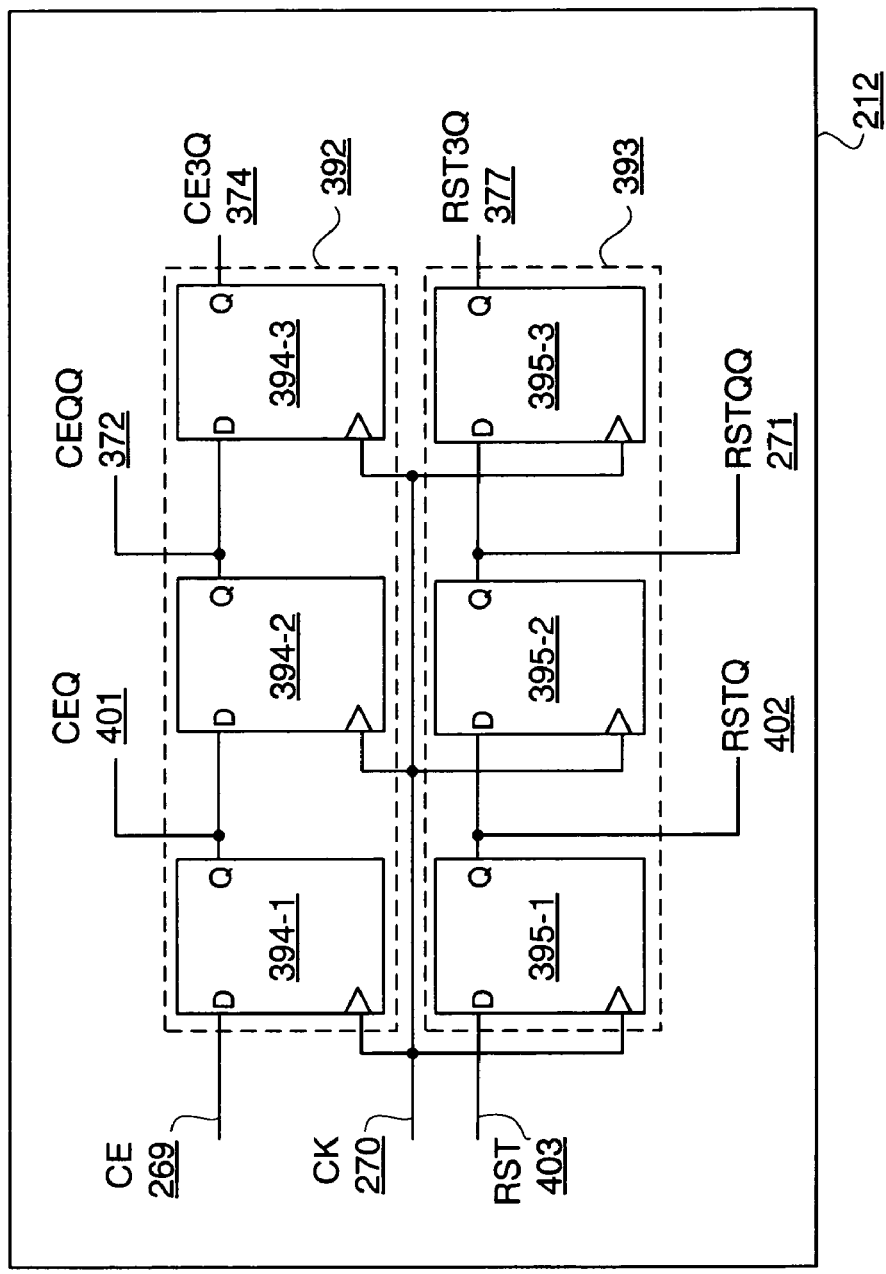
FIG. 3C is a schematic diagram depicting an exemplary embodiment of control circuitry of the pipeline FFT architecture of FIG. 2.

FIG. 3C is a schematic diagram depicting an exemplary embodiment of control circuitry 212 of FIG. 2. Control circuitry 212 may include a clock enable pipeline 392 and a reset pipeline 393. Clock enable pipeline 392 receives a clock enable signal 269, which may be held to a logic high value. Clock enable pipeline 392 may include flip-flops 394-1 through 394-3 coupled as a shift register chain with clock enable signal 269 as an initial data input. After passing through flip-flop 394-1, a first pipeline stage clock enable signal 401 may be obtained. After passing through a second flip-flop 394-2 in the chain, a second pipeline stage clock enable signal 372 may be obtained. And, after passing through a third stage flip-flop 394-3, a third stage pipeline clock enable signal 374 may be obtained. Notably, flip-flops 394-1 through 394-3 are all clocked responsive to clock signal 270.

Control circuitry 212 may further include a reset pipeline 393. For reset pipeline 393, a reset signal 403 is provided as a data input to a first flip-flop 395-1 in a chain of three flip-flops, namely flip-flops 395-1 through 395-3. Flip-flops 395-1 through 395-3 are all clocked responsive to clock signal 270. Output of flip-flop 395-1 may be obtained as a first pipeline stage reset signal 402. Output of flip-flop 395-2 may be obtained as a second pipeline stage reset signal 271, and output of flip-flop 395-3 may be obtained as a third pipeline stage reset signal 377.

Notably, pipelined clock enable and reset signals may be employed to avoid use of a global clock enable or global reset signal. It should be appreciated that by providing data through a pipeline, data is effectively provided to each stage in what is termed "waves." Thus, clock signals may be enabled or devices reset by starting and stopping each stage, and data may ripple through such a pipeline synchronously. However, alternatively, a global clock enable signal or a global reset signal, or a combination thereof, may be used provided pipelined operation is appropriately adjusted. Notably, signals 401 and 402 are used here for metastability; however, if metastability is not an issue, then pipelines 392 and 393 may each be shortened by one level of pipelining, for example each may be shortened by one flip-flop.

Radix-2 butterflies 220 and 222 of FIG. 3A each may be implemented with six arithmetic blocks using DSP48 slices. More particularly, FIGS. 5A through 5E are schematic/block diagrams depicting an exemplary embodiment of an implementation of Radix-2 butterfly 220 of FIG. 3A, and FIGS. 6A through 6C are schematic/block diagrams depicting an exemplary embodiment of an implementation of Radix-2 butterfly 222 of FIG. 3A with some redundancy omitted. The signal nomenclature in FIGS. 5A through 5E and 6A through 6C in addition to that previously described, includes APBQ is for complex A plus B output, AMBQ is for complex A minus B output, PCRE is for a real segment provided via a PC bus of a DSP48 slice as indicated in FIG. 4, PQRE is for real portion of an output provided via a PC bus of a DSP48 slice as indicated in FIG. 4, and PRECRYIN is for a real portion of a carry input provided via a PC bus of a DSP48 slice as indicated in FIG. 4. Other signal notations follow from these descriptions and other signal descriptions herein.

Figure 5A:
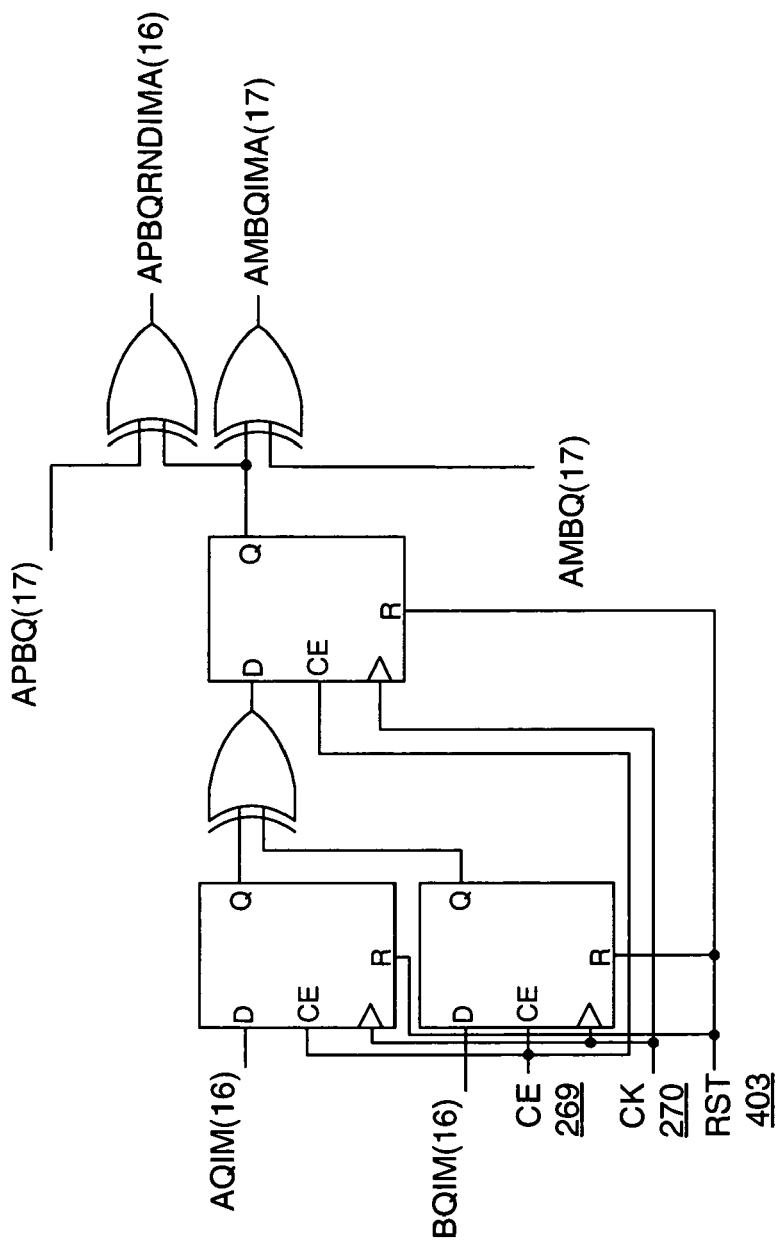
FIGS. 5A through 5E are schematic/block diagrams depicting an exemplary embodiment of an implementation of a first Radix-2 butterfly.
Figure 5B:
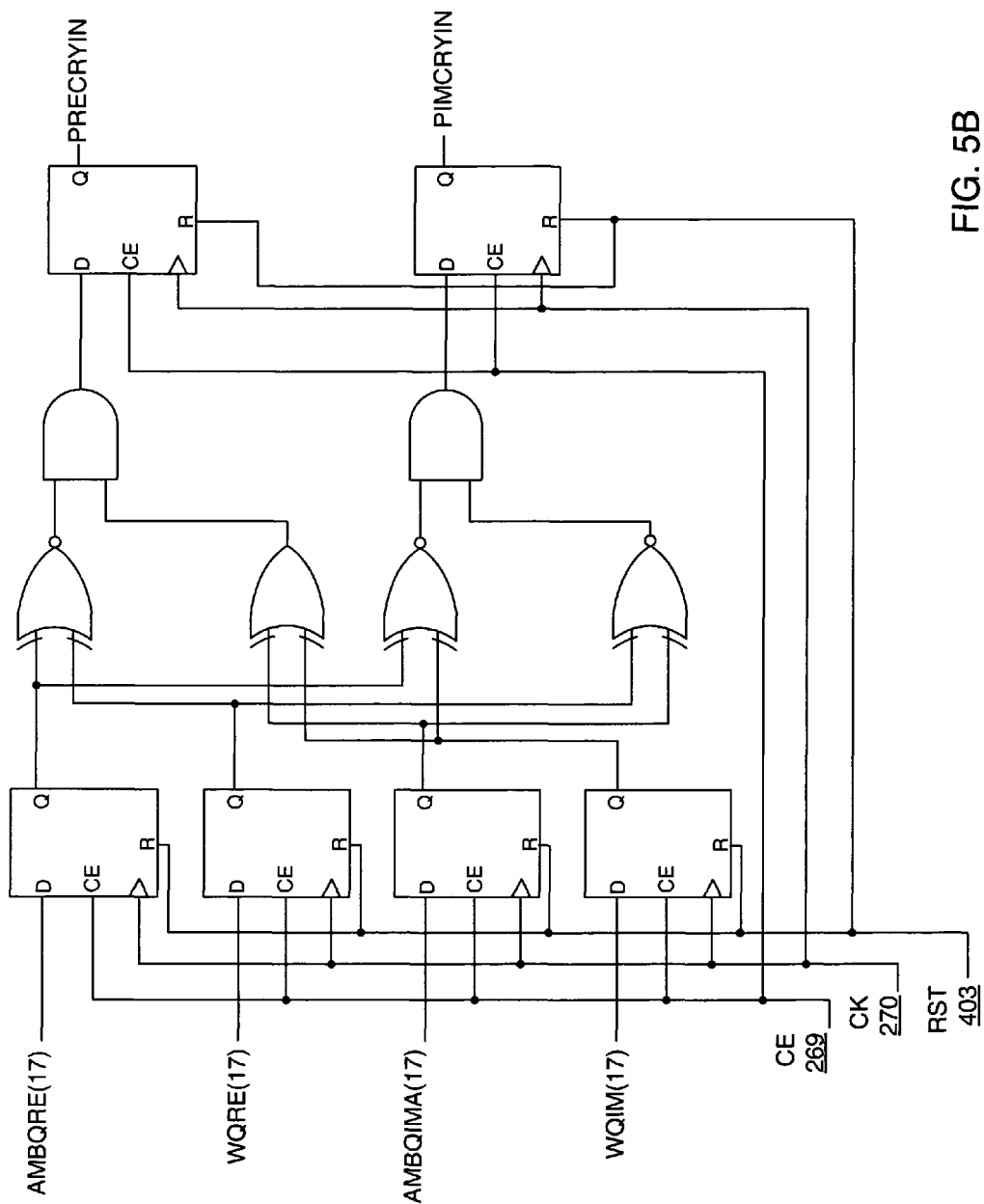
Figure 5C:
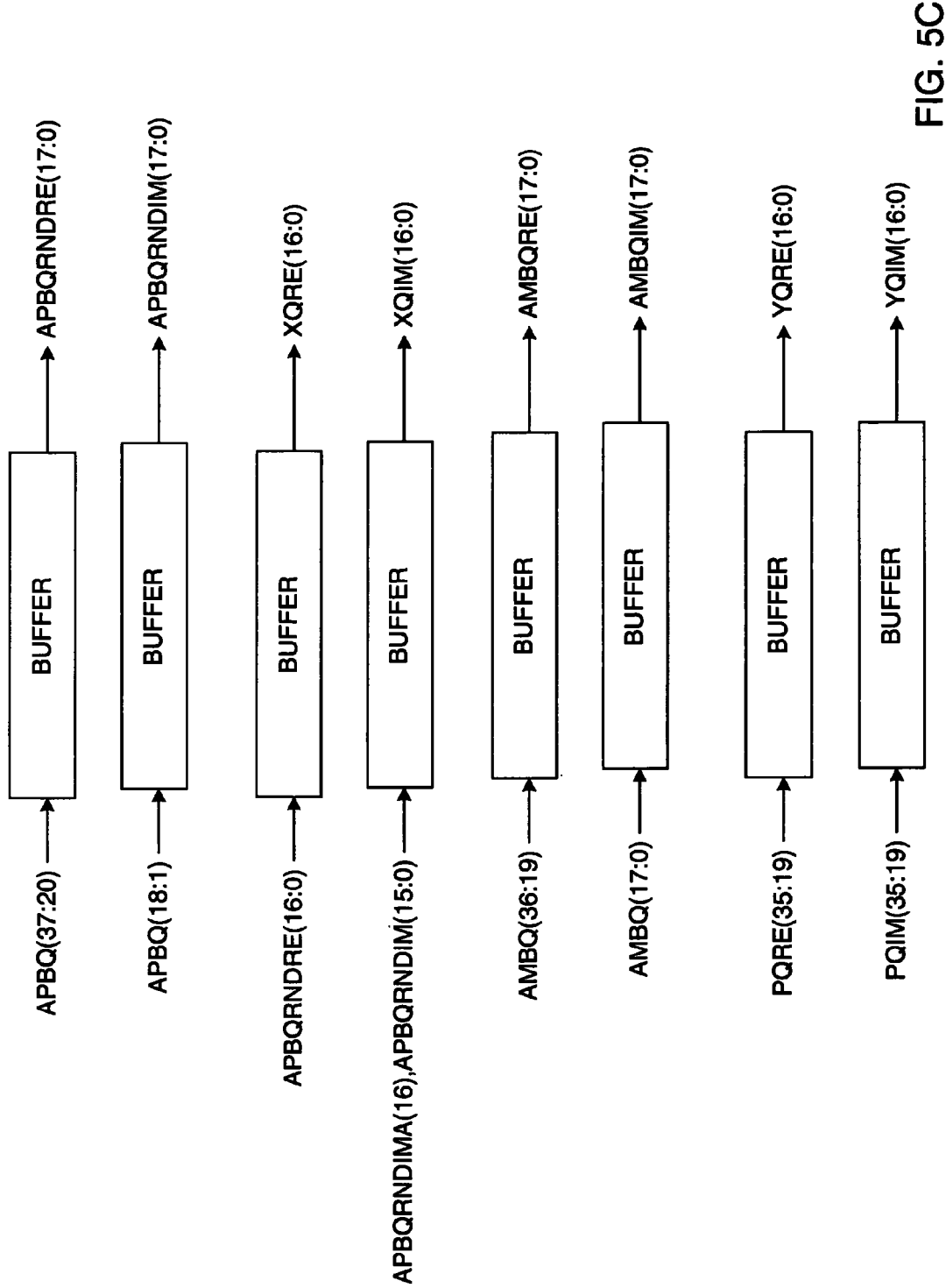
Figure 5D:
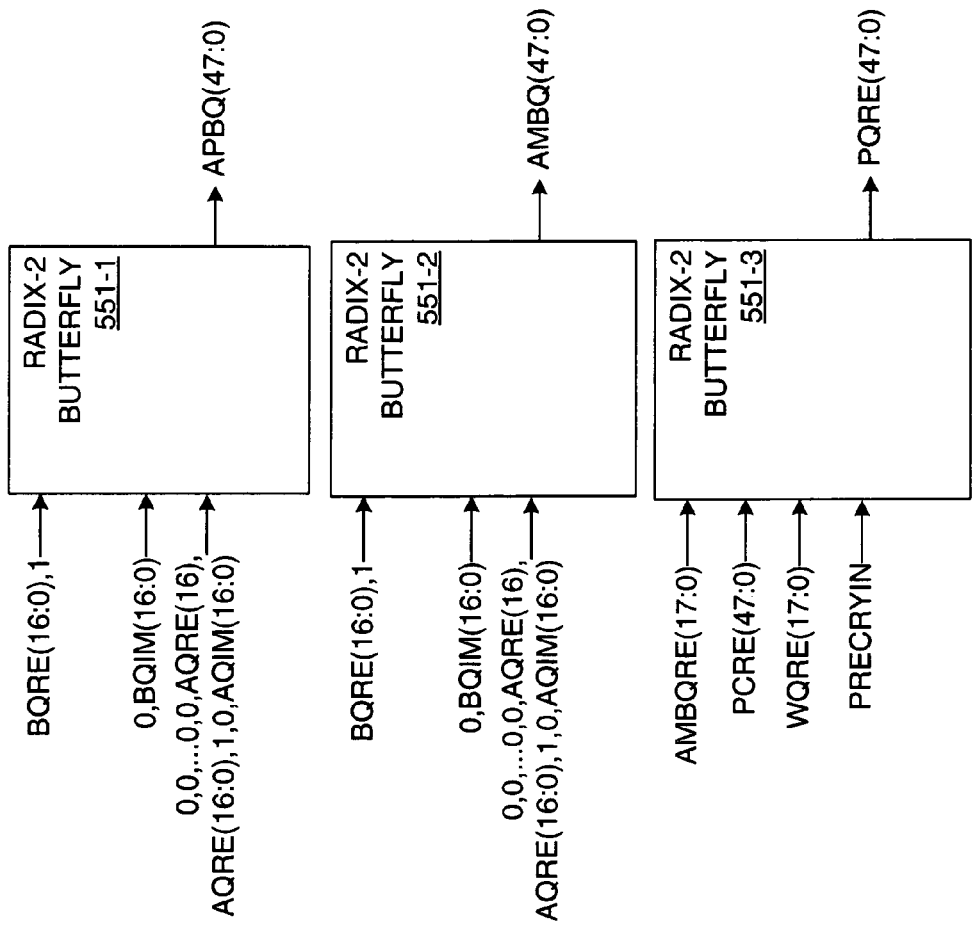
Figure 5E:
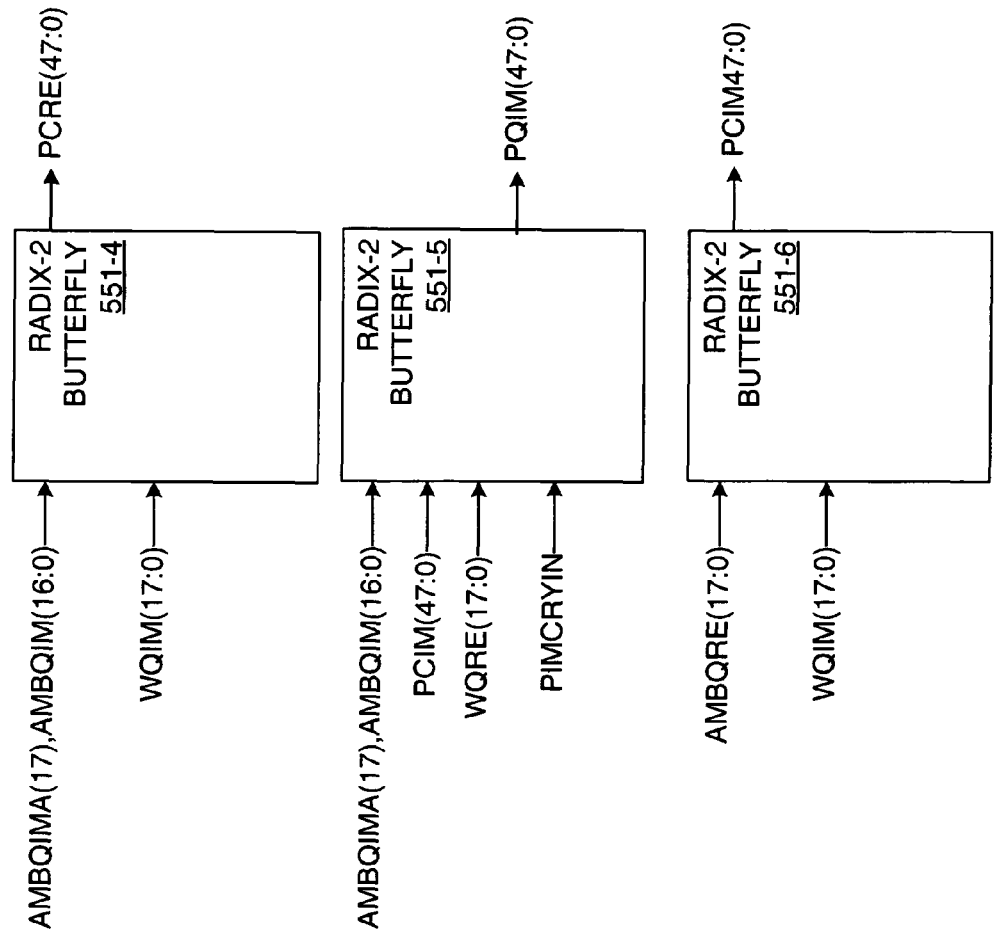

With reference to FIGS. 5A through 5E, FIGS. 5A and 5B are schematic diagrams depicting an exemplary implementation of logic and registers used for providing signals to arithmetic blocks of Radix-2 butterfly 220 of FIG. 3A. FIG. 5C is a block diagram depicting an exemplary implementation of buffers that may be used for an implementation of Radix-2 butterfly 220 of FIG. 3A. Notably, buffers of FIG. 5C may be trimmed out or otherwise omitted, but have been included here for signal tracking for purposes of clarity. For example, PQRE is an output signal of a real portion from a P register of a DSP48 slice, and this output could have been named YQRE. Thus, these buffers are illustratively provided for naming convention. However, a composite bus may be used. FIGS. 5D and 5E are block diagrams depicting six Radix-2 butterfly arithmetic blocks 551-1 through 551-6. Notably, not all the signals for input and output from each arithmetic block 551-1 through 551-6 are shown for purposes of clarity. Furthermore, logic high and logic low states are respectively represented with a "1" and a "0." Radix-2 butterfly arithmetic blocks 551-1 through 551-6 may be implemented in accordance with Rabiner and Gold, as previously described. Additionally, it should be understood that Radix-2 butterfly arithmetic blocks 551-1 through 551-6 may be implemented as six corresponding DSP slices. Again, as indicated above, six DSP48 slices may be used to implement a Radix-2 butterfly.

Figure 6A:
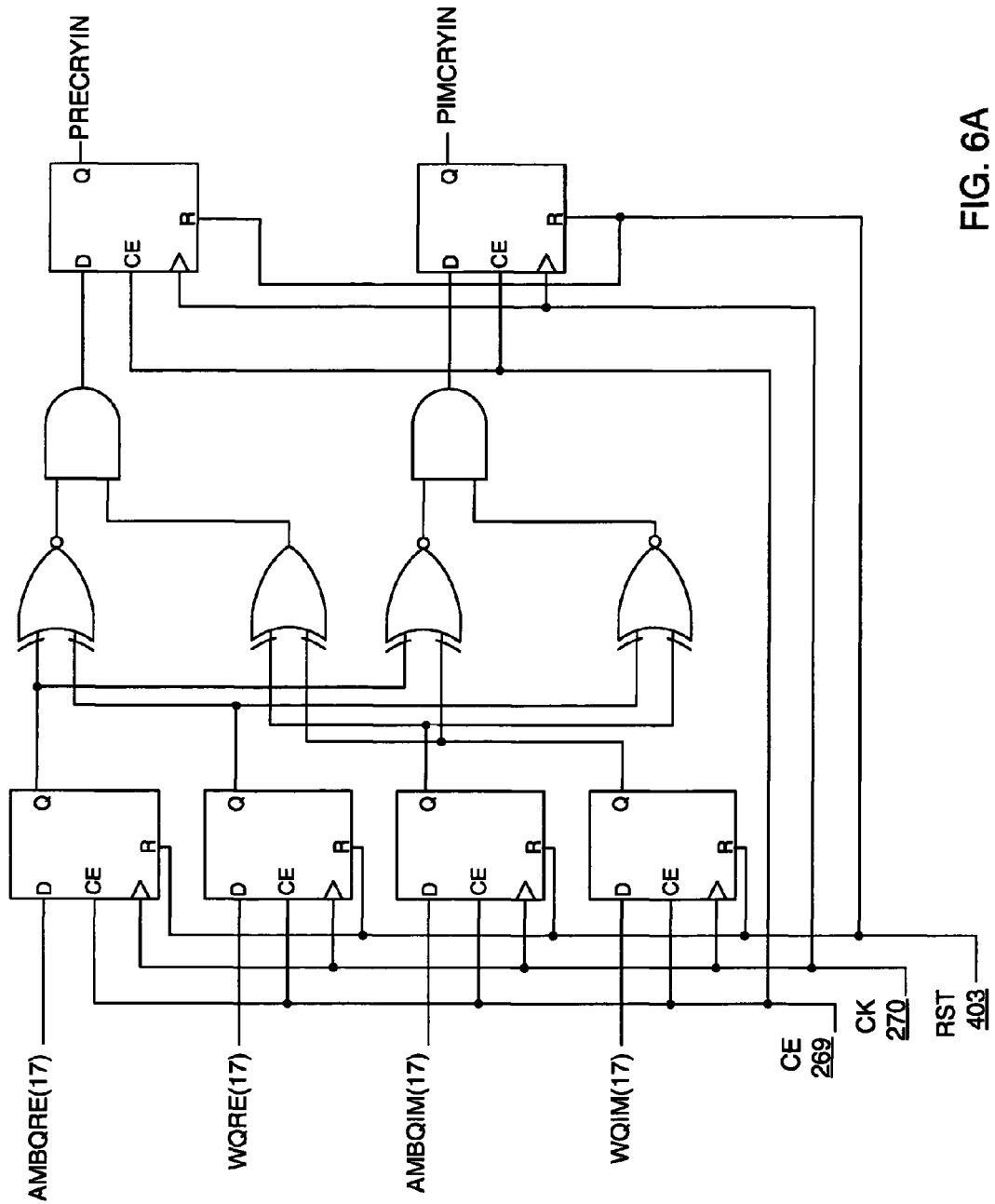
FIGS. 6A through 6C are schematic/block diagrams depicting an exemplary embodiment of an implementation of a second Radix-2 butterfly.
Figure 6B:
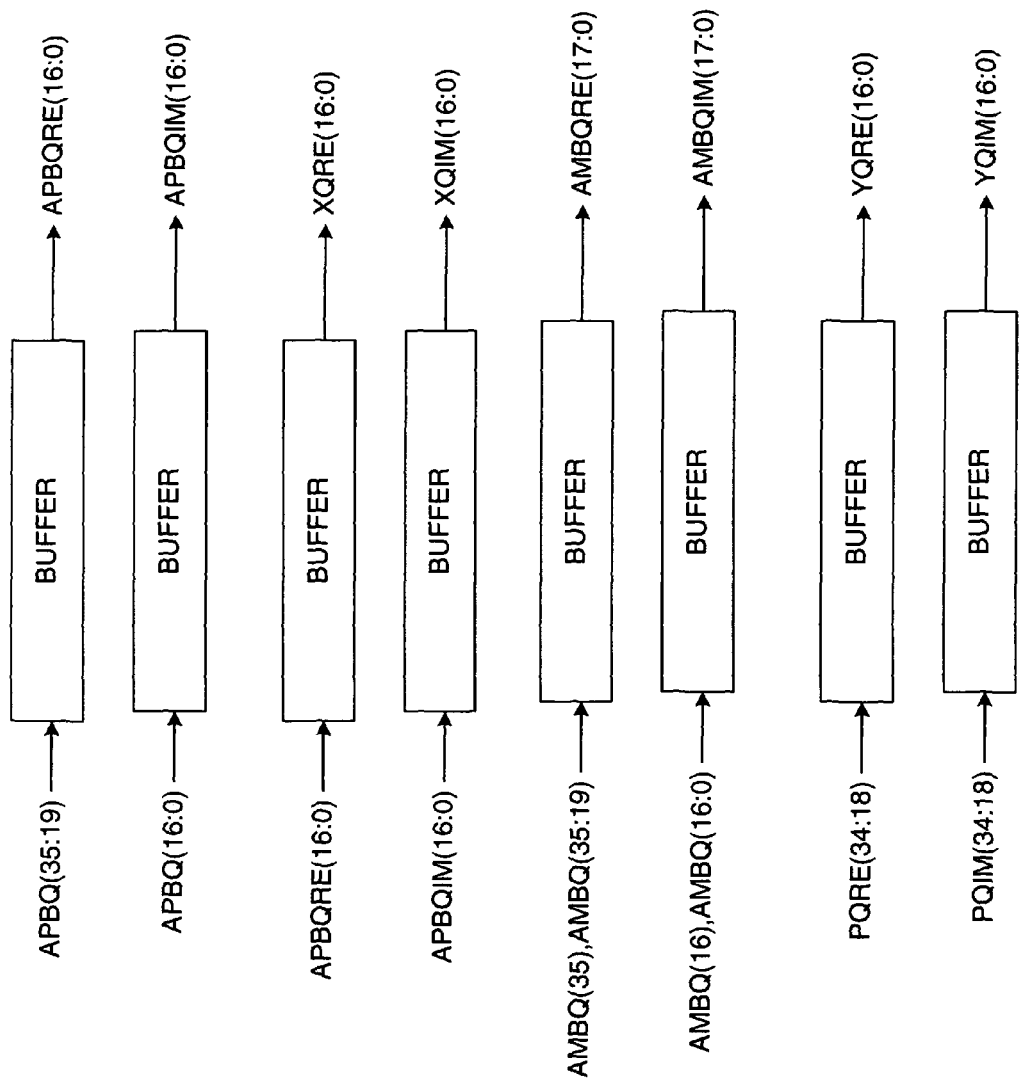
Figure 6C:
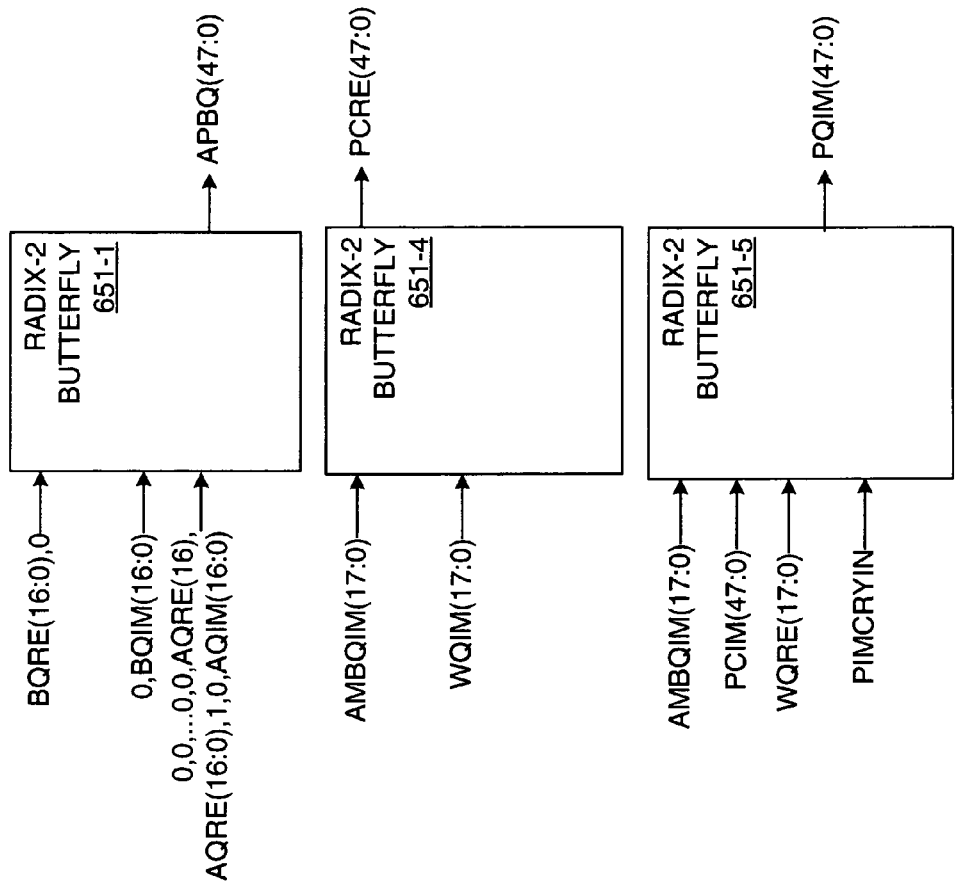

FIGS. 6A through 6E are for an exemplary implementation of a Radix-2 butterfly 222 of FIG. 3A. For purposes of clarity and not limitation, it is assumed that the same twiddle factors are used for both Radix-2 butterflies 220 and 222; however, as indicated above, different twiddle factors may be used as between Radix-2 butterflies 220 and 222. Notably, FIG. 6A is similar to FIG. 5B, except that AMBQIM(17) is used instead of AMBQIMA(17) for an input. FIG. 6B is a block diagram depicting buffers that may be used in an exemplary implementation of Radix-2 butterfly 222 of FIG. 3A. FIG. 6B is similar to FIG. 5C, except that some of the signals, as well as bit locations, are different. Notably, buffers of FIG. 6B likewise may be trimmed out or otherwise omitted, but have been included here for purposes of signal tracking for clarity. Thus, these buffers are illustratively provided for naming convention. However, a composite bus may be used. FIG. 6C is a block diagram depicting three of the six arithmetic blocks that may be used in an exemplary implementation for Radix-2 butterfly 222 of FIG. 3A. Arithmetic blocks 651-1, 651-4 and 651-5 are similar to arithmetic blocks 551-1, 551-4 and 551-5 of FIG. 5E. Notably, arithmetic blocks 551-2 through 551-3 and 551-6 of FIGS. 5D and 5E, respectively, may be the same for both Radix-2 butterflies 220 and 222 at this level, and thus are not repeated in FIG. 6C. Notably, at this level arithmetic blocks 551-1 and 651-1 differ by only by state of a pad bit following a BORE input. Accordingly, it should be understood that Radix-2 butterfly 222 of FIG. 3A may be implemented with six arithmetic blocks 651-1, 551-2, 551-3, 651-4, 651-5, and 551-6, where these six arithmetic block may be implemented as six corresponding DSP slices. Again, as indicated above, six DSP48 slices may be used to implement a Radix-2 butterfly.

Figure 7A:
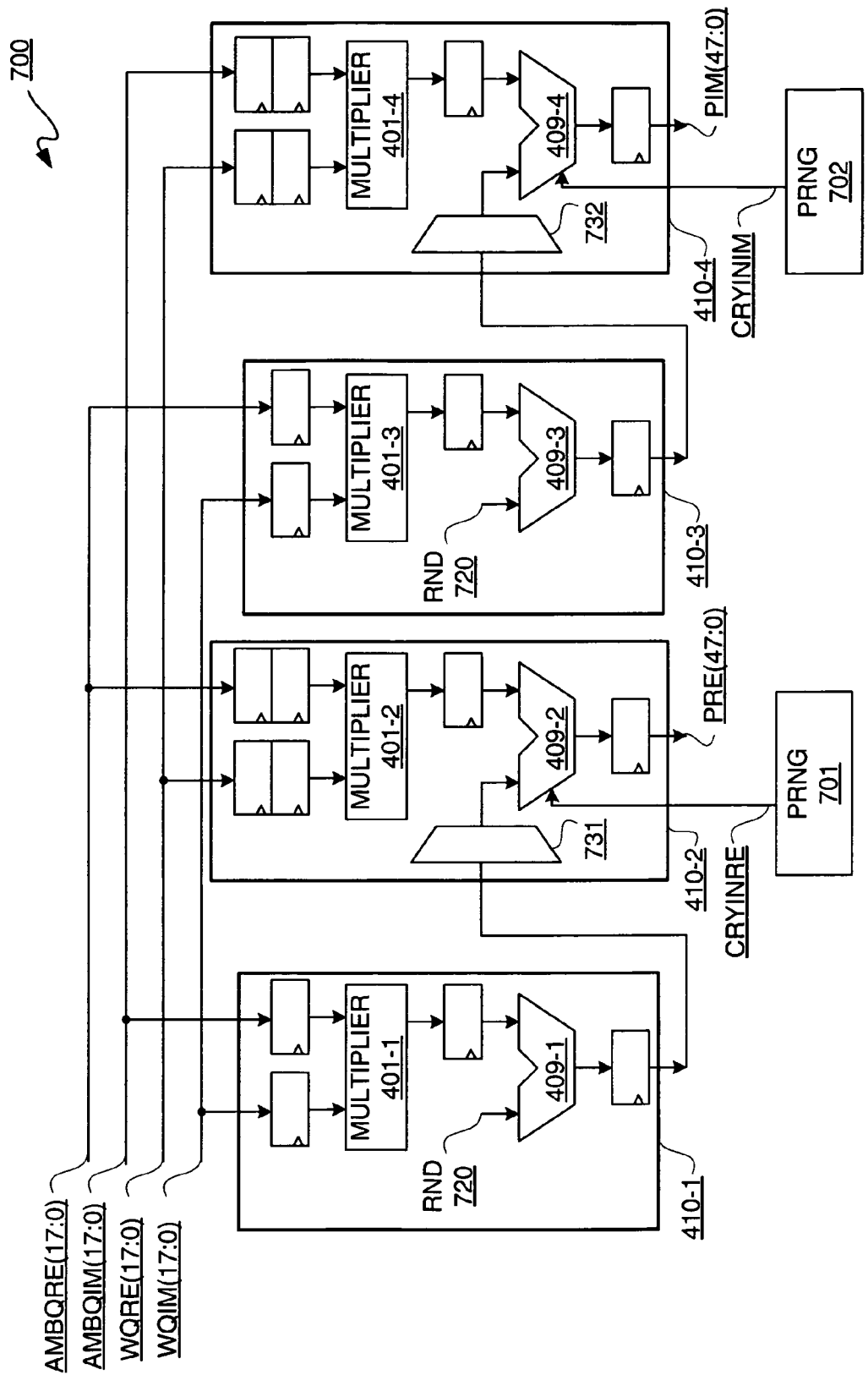
FIGS. 7A and 7B are block diagrams depicting respective exemplary embodiments of example pipelined multiplier implementations for multiplication of complex numbers.
Figure 7B:
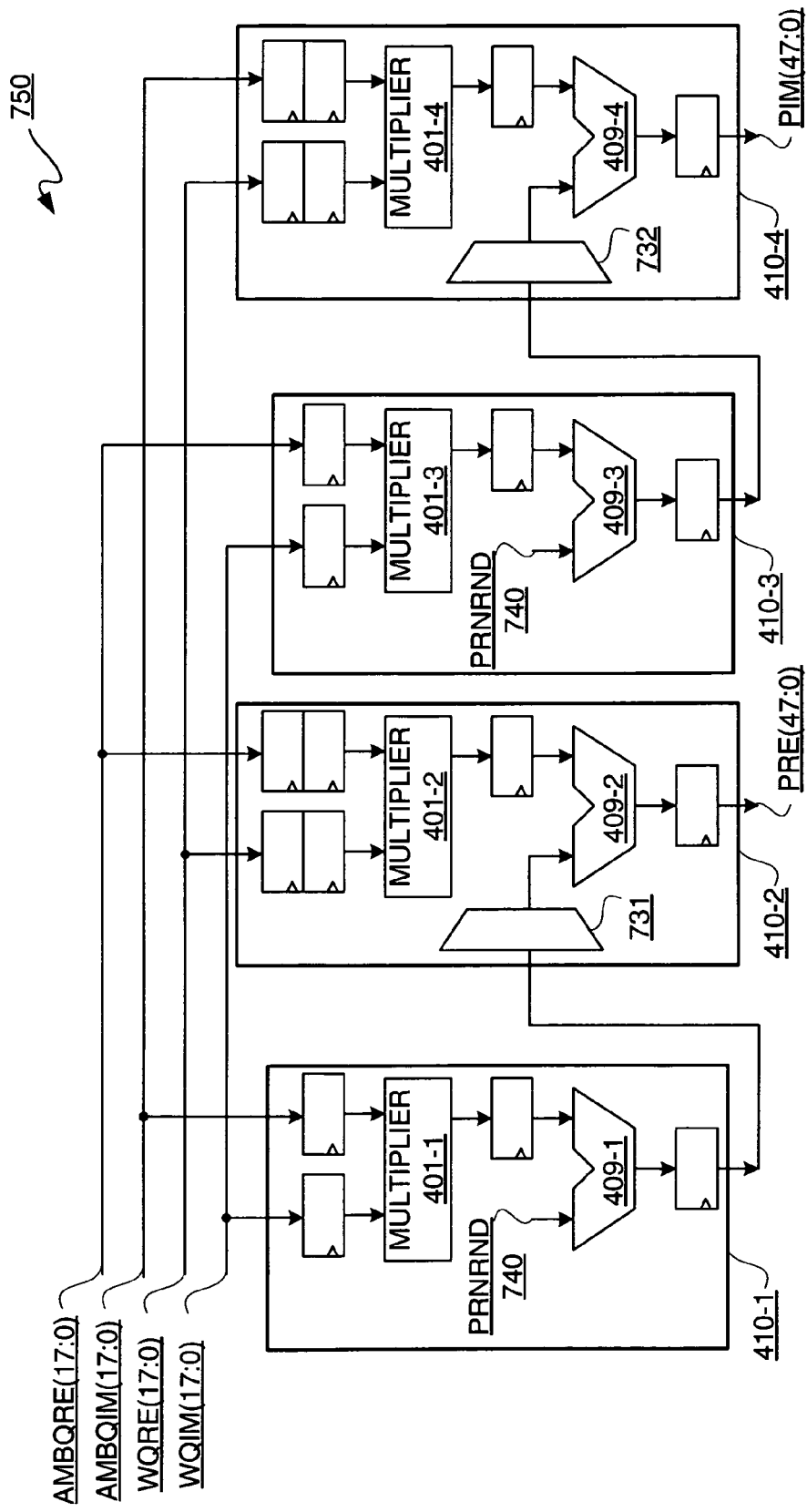

FIGS. 7A and 7B are block diagrams depicting respective exemplary embodiments of example pipelined multiplier implementations 700 and 750 for multiplication of complex numbers. Each of multiplier implementation 700 and 750 may use DSP48 slices 410-1 through 410-4. AMBQRE(17: 0), AMBQIM(17:0), WQRE(17:0), and WQIM(17:0) are provided to DSP48 slices 410-1 through 410-4 the same in each multiplier implementation 700 and 750.

With reference to FIG. 7A, AMBQIM(17:0) and WQIM (17:0) are respectively input to one stage of flip-flops of DSP slice 410-1 for multiplication by a multiplier 401-1 thereof. Output of multiplier 401-1 is provided as an input to a flip-flop and then as an input to adder/subtractor 409-1. Another input to adder/subtractor 409-1 is rounding constant signal ("rounding constant") 720. Rounding constant 720 may be premised on anticipated or likely outcome, positive or negative, of adder 409-1. Rounding constant 720 may be a value that is at or below the rounding point. Output of adder/subtractor 409-1 is provided to a flip-flop and then as an input to a multiplexer 731 of DSP slice 410-2. Multiplexer 731 may be a Z multiplexer of a DSP48 slice as illustratively shown in FIG. 4. Output of multiplexer 731 is provided as an input to adder/subtractor 409-2 of DSP slice 410-2.

Another input to adder/subtractor 409-2 may be an output of a pseudo-random number generator ("PRNG") 701. Output of PRNG 701 is a carry input real signal ("CRYINRE"). CRYINRE may be a value that is at or below the rounding point. CRYINRE may be provided to a carry input port of adder/subtractor 409-2.

AMBQRE(17:0) and WQRE(17:0) are respectively input to two stages of flip-flops of DSP slice 410-2 for multiplication by a multiplier 401-2 thereof. Output of multiplier 401-2 is provided as an input to a flip-flop and then as an input to adder/subtractor 409-2. Output of adder/subtractor 409-2 is provided to a flip-flop and then as a real portion of the complex multiplication of (A−B)W on a P bus of DSP slice 410-2, namely PRE(47:0).

DSP slice 410-3 and DSP slice 410-4 are respectively configured the same as DSP slice 410-1 and DSP slice 410-2. AMBQRE(17:0) and WQIM(17:0) are respectively input to one stage of flip-flops of DSP slice 410-3 for multiplication by a multiplier 401-3 thereof. Notably, a same rounding constant 720 may be used, or alternatively different rounding constant values as between DSP slices 410-1 and 410-3 may be used. AMBQIM(17:0) and WQRE(17:0) are respectively input to two stages of flip-flops of DSP slice 410-4 for multiplication by a multiplier 401-4 thereof. Notably, though a separate PRNG 702 is used to provide a carry input imaginary signal ("CRYINIM") to a carry input port of add/subtractor 409-4 of DSP slice 410-4, CRYINRE and CRYINIM may be the same signal such that PRNG may be used for both DSP 410-2 and 410-4 slices. Output of adder/subtractor 409-4 is provided to a flip-flop and then as an imaginary portion of the complex multiplication of (A−B)W on a P bus of DSP slice 410-4, namely PIM(47:0).

With reference to FIG. 7B, generally only differences between example pipelined multiplier implementations 700 and 750 for multiplication of complex numbers are described to avoid repetition. Rather than using constant rounding, such rounding constants 720 are replaced with pseudo-random number rounding constant signals ("PRNRND") 740. PRNRND 740, though illustratively shown as being used in both DSP slices 410-1 and 410-3, may in an alternative implementation be different pseudo-random numbers. PRNRD 740 may be generated by a PRNG, such as described with reference to FIG. 7A. PRNRD 740 may be a value that is at or below the rounding point. Accordingly, though multiplexers 731 and 732 are illustratively shown for coupling respective outputs of DSP slices as previously described, such multiplexers 731 and 732 need not be used, as in another implementation an output of DSP slice 410-1 may be more directly coupled to an input of adder/subtractor 409-2, and an output of DSP slice 410-3 may be more directly coupled to an input of adder/subtractor 409-4.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. For example, different bit widths, bit positions, and numbers of DSP slices, other than those specifically described herein, may be used as may vary from application-to-application. Claim(s) listing steps do not imply any order of the steps. Trademarks are the property of their respective owners.

What is claimed is:

1. A pipeline Fast Fourier Transform architecture, comprising:
    a first Radix-2 butterfly stage coupled to receive a first input and configured to provide a first output responsive to the first input, the first Radix-2 butterfly stage configured to truncate at least one Least Significant Bit of the first output for a Fast Fourier Transform;
    a first delay and swap stage coupled to receive the first output and configured to provide a second output;
    a second Radix-2 butterfly stage coupled to receive the second output, the second Radix-2 butterfly stage configured to provide a third output responsive to the second output, the second Radix-2 butterfly stage configured to truncate at least one Most Significant Bit of the third output for the Fast Fourier Transform, wherein the at least one Most Significant Bit of the third output is a sign bit; and
    the first Radix-2 butterfly stage and the second Radix-2 butterfly stage being implemented in digital signal processing circuits;
    wherein, for a Single-Instruction Multiple Data operation, pad bits are used to block intra-segment ripple carry between an imaginary segment and a real segment as associated with complex numbers.

2. The Fast Fourier Transform architecture according to claim 1, further comprising control circuitry coupled to provide control signals to the first Radix-2 butterfly stage, the first delay and swap stage, and the second Radix-2 butterfly stage, the control circuitry including a first pipeline for providing reset signaling and a second pipeline for providing clock activation signaling.

3. The Fast Fourier Transform architecture according to claim 1, wherein the first output includes a complex number X1 and a complex number Y1.

4. The Fast Fourier Transform architecture according to claim 3, wherein the first Radix-2 butterfly stage is configured to perform a first addition of complex numbers A and B to provide the complex number X1 and to perform a first subtraction of the complex numbers A and B to provide the complex number Y1.

5. The Fast Fourier Transform architecture according to claim 4, wherein the first Radix-2 butterfly stage is further configured to perform a first multiplication of a first result from the first subtraction by a first complex twiddle factor to provide the complex number Y1.

6. The Fast Fourier Transform architecture according to claim 5, wherein the second Radix-2 butterfly stage is configured to perform a second addition of the complex number X1 and the complex number Y1 to provide a complex number X2 and is configured to perform a second subtraction of the complex number X1 and the complex number Y1 to provide a complex number Y2.

7. The Fast Fourier Transform architecture according to claim 6, wherein the second Radix-2 butterfly stage is further configured to perform a second multiplication of a second result from the second subtraction by a second complex twiddle factor to provide the complex number Y2.

8. The Fast Fourier Transform architecture according to claim 1, wherein the first Radix-2 butterfly stage is configured to provide a complex number X1 and a complex number Y1 according to:

$$X1 = A + B;\text{ and}$$

$$Y1 = (A - B)W1$$

for A and B being complex numbers and for W1 being a first complex twiddle factor.

9. The Fast Fourier Transform architecture according to claim 8, wherein the first Radix-2 butterfly stage is implemented in six of the digital signal processing circuits.

10. The Fast Fourier Transform architecture according to claim 8, wherein the second Radix-2 butterfly stage is configured to provide a complex number X2 and a complex number Y2 according to:

$$X2 = X1 + Y1;\text{ and}$$

$$Y2 = (X1 - Y1)W2$$

for W2 being a second complex twiddle factor and where the complex number X1 and the complex number Y1 are commutable as part of the second output.

11. The Fast Fourier Transform architecture according to claim 10, wherein the second Radix-2 butterfly stage is implemented in six of the digital signal processing circuits.

12. The Fast Fourier Transform architecture according to claim 10, wherein if input operands of imaginary segments have different sign bits, a Most Significant Bit correction is used.

13. The Fast Fourier Transform architecture according to claim 10, wherein for a Single-Instruction Multiple Data operation, a result of at least one of A−B or X1−Y1 is provided by:
    inverting a multiplexer output;
    adding using the multiplexer output to provide a summation result; and
    inverting the summation result to avoid having to have a carry input.

14. A method of implementing a Fast Fourier Transform, the method comprising:
    receiving a first input at a first Radix-2 butterfly stage configured in an integrated circuit to provide a first output responsive to the first input and to truncate at least one Least Significant Bit of the first output for the Fast Fourier Transform;
    coupling the first output to a first delay and swap stage configured to provide a second output; and
    coupling the second output to a second Radix-2 butterfly stage configured to provide a third output responsive to the second output and to truncate at least one Most Significant Bit of the third output for the Fast Fourier Transform, wherein the at least one Most Significant Bit of the third output is a sign bit;

wherein, for a Single-Instruction Multiple Data operation, pad bits are used to block intra-segment ripple carry between an imaginary segment and a real segment as associated with complex numbers.

15. The method according to claim 14, further comprising configuring the first Radix-2 butterfly stage to perform a first addition of complex numbers A and B to provide a complex number X1 of the first output and to perform a first subtraction of the complex numbers A and B to provide a complex number Y1 of the first output.

16. The method according to claim 15, further comprising performing, by the first Radix-2 butterfly stage, a first multiplication of a first result from the first subtraction by a first complex twiddle factor to provide the complex number Y1.

17. The method according to claim 16, further comprising performing a second addition of the complex number X1 and the complex number Y1 to provide a complex number X2 and performing a second subtraction of the complex number X1 and the complex number Y1 to provide a complex number Y2.

18. A method of implementing a Fast Fourier Transform, the method comprising:
receiving real and imaginary portions of a first complex number at a first digital signal processing circuit of a first butterfly stage in an integrated circuit device;
receiving the real and imaginary portions of the first complex number at a second digital signal processing circuit of the first butterfly stage in the integrated circuit device;
coupling real and imaginary portions of a second complex number to each of the first digital signal processing circuit and the second digital signal processing circuit by way of a shared input;
performing complex addition using the first digital signal processing circuit to provide a complex number X1;
performing complex subtraction using the second digital signal processing circuit to provide a complex number Y1;
configuring the first butterfly stage to provide a first output and to truncate at least one Least Significant Bit of the first output;
coupling the first output to a first delay and swap stage which generates a second output; and
configuring a second butterfly stage, coupled to the first butterfly stage, to provide a third output responsive to the second output, the second butterfly stage configured to truncate at least one Most Significant Bit of the third output, wherein the at least one Most Significant Bit of the third output is a sign bit;
wherein, for a Single-Instruction Multiple Data operation, pad bits are used to block intra-segment ripple carry between an imaginary portion and a real portion as associated with complex numbers.

19. The method according to claim 18, further comprising performing a multiplication using the result of the complex subtraction by a first complex twiddle factor to provide the complex number Y1.

20. The method according to claim 19, further comprising performing a second addition of the complex number X1 and the complex number Y1 to provide a complex number X2 and performing a second subtraction of the complex number X1 and the complex number Y1 to provide a complex number Y2.

* * * * *